US012687643B2

(12) United States Patent
Yu

(10) Patent No.: US 12,687,643 B2
(45) Date of Patent: Jul. 21, 2026

(54) METHODS AND DEVICES FOR PERFORMING MINI-BATCH DISCRETE FOURIER TRANSFORMS FOR TRACKING SATELLITE SIGNALS

(71) Applicant: Deere & Company, Moline, IL (US)

(72) Inventor: Wei Yu, Torrance, CA (US)

(73) Assignee: Deere & Company, Moline, IL (US)

( * ) Notice: Subject to any disclaimer, the term of this patent is extended or adjusted under 35 U.S.C. 154(b) by 379 days.

(21) Appl. No.: 18/229,815

(22) Filed: Aug. 3, 2023

(65) Prior Publication Data

US 2024/0125942 A1 Apr. 18, 2024

Related U.S. Application Data

(60) Provisional application No. 63/416,419, filed on Oct. 14, 2022.

(51) Int. Cl.
*G01S 19/30* (2010.01)
*G01S 19/37* (2010.01)

(52) U.S. Cl.
CPC .............. *G01S 19/30* (2013.01); *G01S 19/37* (2013.01)

(58) Field of Classification Search
CPC ..... G01S 19/30; G01S 19/37; H04B 1/70752; H04B 2001/70706
See application file for complete search history.

(56) References Cited

U.S. PATENT DOCUMENTS

| | | | |
|---|---|---|---|
| 8,013,789 B2 | 9/2011 | Van Graas et al. | |
| 9,063,224 B2 | 6/2015 | De Latour | |

(Continued)

FOREIGN PATENT DOCUMENTS

JP 2016189574 A * 11/2016

OTHER PUBLICATIONS

Gold code. (2001). Hargrave's Communications Dictionary, Wiley (1st ed.). Wiley. https://search.credoreference.com/articles/Qm9va0FydGljbGU6MTQ2NTU2MA==?aid=279753 (Year: 2001).*

(Continued)

*Primary Examiner* — Resha Desai
*Assistant Examiner* — Fred H Mull
(74) *Attorney, Agent, or Firm* — Morgan, Lewis & Bockius LLP

(57) ABSTRACT

A method includes receiving a respective channel signal from a respective satellite encoded with a pseudorandom number (PN) sequence. The method includes, for the respective channel signal: generating and aggregating intermediate results for a plurality of epochs of a single pseudorandom number (PN) sequence period of the PN sequence, including: for each respective epoch of the plurality of epochs, analyzing samples of the respective channel signal using a discrete Fourier transform (DFT), to produce an intermediate result for the respective epoch; and aggregating the intermediate results for the plurality of epochs to produce a DFT correlation result. The method includes processing the DFT correlation result to produce a code phase correction for the respective channel and, in accordance with the code phase correction, computing position and velocity estimates for the mobile object; and performing a navigation function for the mobile object.

20 Claims, 11 Drawing Sheets

(56)                References Cited

U.S. PATENT DOCUMENTS

| | | | | |
|---|---|---|---|---|
| 2002/0025011 A1* | 2/2002 | Sullivan | G01S 19/30 | |
| | | | 375/343 | |
| 2004/0013175 A1* | 1/2004 | Tanaka | G01S 19/30 | |
| | | | 375/150 | |
| 2004/0098558 A1 | 5/2004 | Warloe et al. | | |
| 2006/0082496 A1* | 4/2006 | Winternitz | G01S 19/37 | |
| | | | 342/357.63 | |
| 2006/0222113 A1* | 10/2006 | Harrison | G01S 19/37 | |
| | | | 342/357.77 | |
| 2007/0274374 A1 | 11/2007 | Abraham | | |
| 2009/0304050 A1* | 12/2009 | Eade | G01S 19/37 | |
| | | | 375/150 | |
| 2011/0261805 A1* | 10/2011 | Landry, Jr. | G01S 19/37 | |
| | | | 375/E1.003 | |

OTHER PUBLICATIONS

L.R. Weill, GNSS Solutions: Differences between Signal Acquisition and Tracking, InsideGNSS, p. 22-27 (Year: 2011).*

Yang et al., Generalized Frequency-Domain Correlator for Software GPS Receiver: Preliminary Test Results and Analysis, Air Force Research Laboratory, Sep. 2006, pp. 1-15, [online]. Retrieved from the Internet <URL:https://apps.dtic.mil/sti/tr/pdf/ADA484400.pdf>.

Quasi-Zenith Satellite System Interface Specification Centimeter Level Augmentation Service (IS-QZSS-L6-001), Nov. 5, 2018, pp. 1-91, [online]. Retrieved from the Internet <URL: https://qzss.go.jp/en/technical/download/pdf/ps-is-qzss/is-qzss-I6-001.pdf>.

Frank Van Graas et al., Closed-Loop Sequential Signal Processing and Open-Loop Batch Processing Approaches for GNSS Receiver Design, IEEE Journal of Selected Topics in Signal Processing, Jul. 17, 2009, pp. 571-586.

The International Search Report and the Written Opinion of the International Searching Authority issued in counterpart application No. PCT/US2023/34021, dated Jul. 3, 2025, 13 pages.

Svaton et al., "Novel partial correlation method algorithm for acquisition of GNSS tiered signals", Navigation: Journal of the Institute of Navigation, vol. 67 Issue 4, Dec. 1, 2020, pp. 745-762.

Yang, Chun, "Zoom, Pruning, and Partial FFT for GPS Signal Tracking", Proceedings of the 2001 National Technical Meeting of The Institute of Navigation, Jan. 24, 2001, pp. 839-849.

Pena et al., "Code Shift Keying Prospects for Improving GNSS Signal Designs", Inside GNSS 10.6, Dec. 31, 2015, 11 pages.

Hongyang Zhang et al., "A 2-step GPS carrier tracking loop for urban vehicle applications", Journal of Systems Engineering and Electronics, vol. 28, No. 5, Oct. 2017, pp. 817-826, 10 pgs.

Shuai Jing et al., "Weak and Dynamic GNSS Signal Tracking Strategies for Flight Missions in the Space Service Volume", Journal of Systems Engineering and Electronics, Accepted: Aug. 24, 2016; Published: Sep. 2, 2016, 19 pgs.

Frank van Graas et al., "Comparison of Two Approaches for GNSS Receiver Algorithms: Batch Processing and Sequential Processing Considerations", ION GNSS 18th International Technical Meeting of the Satellite Division, Sep. 13-16, 2005, Long Beach, CA, 12 pgs.

Pablo E. Leibovich et al., "Dedicated Hardware for FFT Based Fast Acquisition of GNSS Signals", Laboratorio de Electrónica Industrial, Control e Instrumentación Departamento de Electrotecnia—Facultad de Ingeniería—Universidad Nacional de La Plata La Plata, Argentina, Conference Paper: Feb. 2015, 5 pgs. https://www.researchgate.net/publication/295087222.

Davide Rovelli et al., "Acquisition speed-up engine for GNSS signals," 2010 5th ESA Workshop on Satellite Navigation Technologies and European Workshop on GNSS Signals and Signal Processing (NAVITEC), Noordwijk, Netherlands, 2010, pp. 1-8, doi: 10.1109/NAVITEC.2010.5708006.

* cited by examiner

500

Acquire GNSS satellite signals — 502

508

Local Replica of PN code

Obtain samples for a respective epoch — 504

516

Perform first DFT on samples for the respective epoch — 506

510

Obtain second DFT of local copy of PN code for epoch

Multiply First DFT and Second DFT — 512

Next Epoch

Aggregate — 514

All Epochs Processed

Time Domain Conversion (IDFT) — 518

Determine Code Phase Correction — 520

Figure 7A:
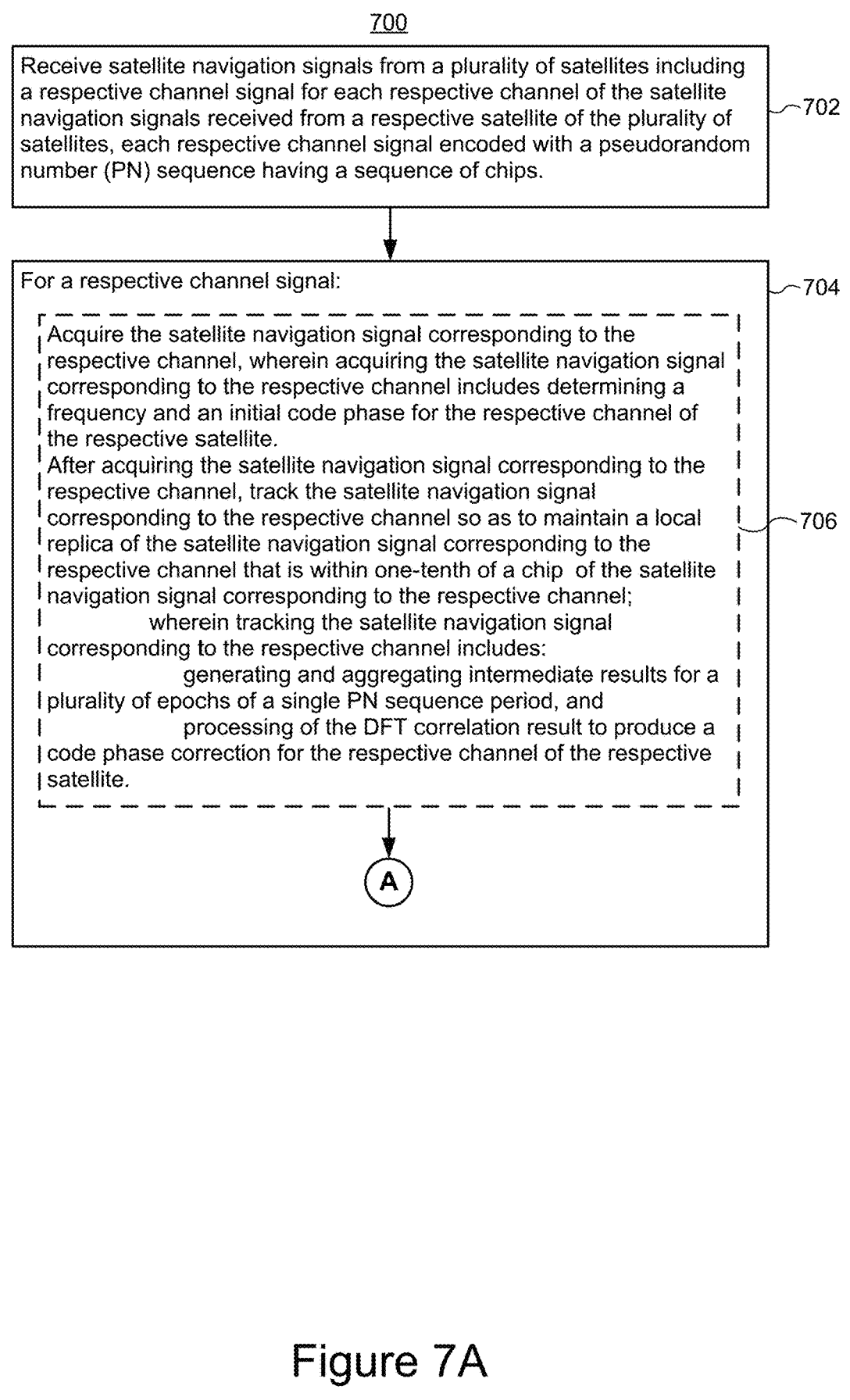

700

| Receive satellite navigation signals from a plurality of satellites including a respective channel signal for each respective channel of the satellite navigation signals received from a respective satellite of the plurality of satellites, each respective channel signal encoded with a pseudorandom number (PN) sequence having a sequence of chips. |

~702

For a respective channel signal:                                                    ~704

Acquire the satellite navigation signal corresponding to the respective channel, wherein acquiring the satellite navigation signal corresponding to the respective channel includes determining a frequency and an initial code phase for the respective channel of the respective satellite.

After acquiring the satellite navigation signal corresponding to the respective channel, track the satellite navigation signal corresponding to the respective channel so as to maintain a local replica of the satellite navigation signal corresponding to the respective channel that is within one-tenth of a chip of the satellite navigation signal corresponding to the respective channel;             ~706 wherein tracking the satellite navigation signal corresponding to the respective channel includes:

generating and aggregating intermediate results for a plurality of epochs of a single PN sequence period, and processing of the DFT correlation result to produce a code phase correction for the respective channel of the respective satellite.

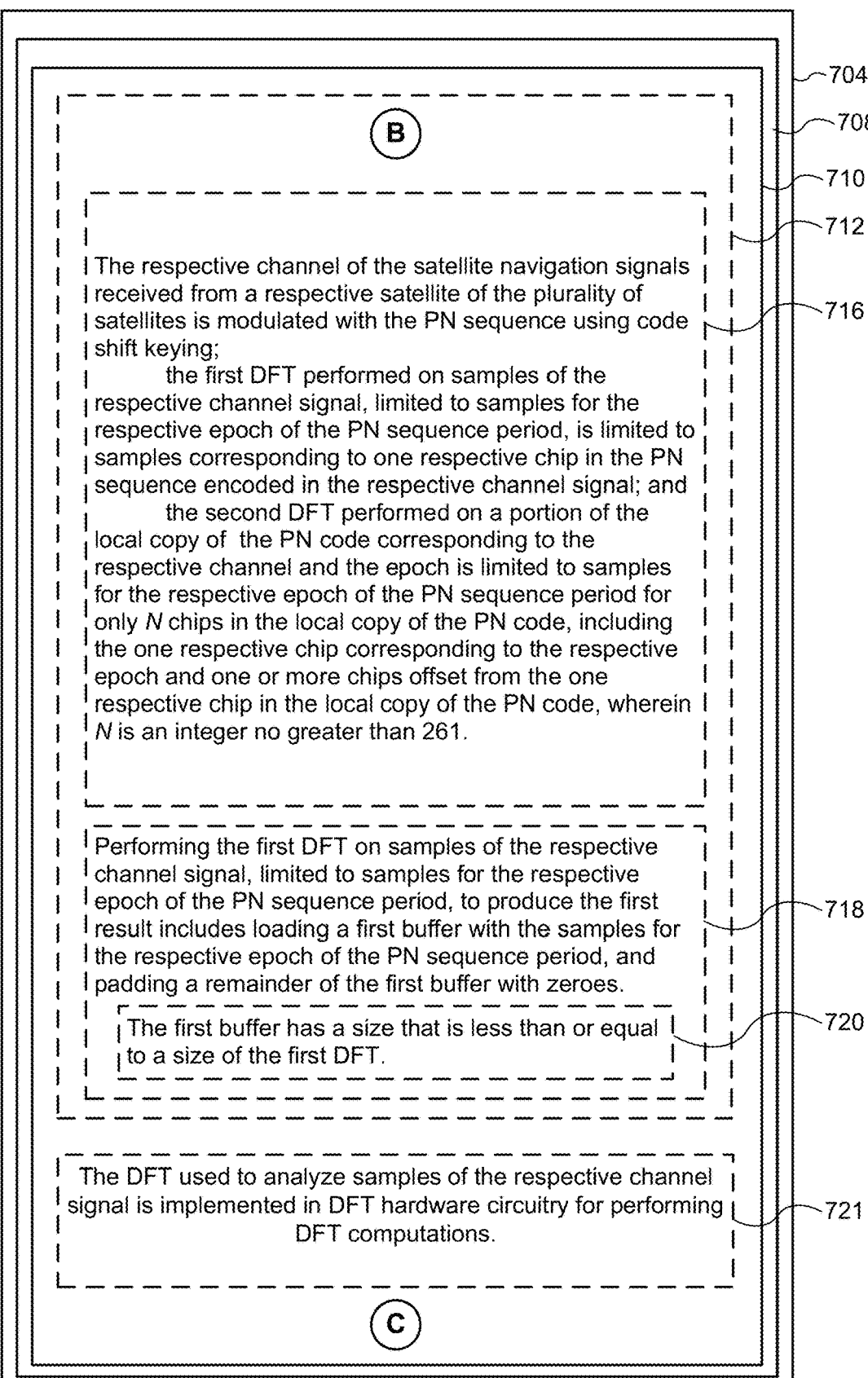

B

The respective channel of the satellite navigation signals received from a respective satellite of the plurality of satellites is modulated with the PN sequence using code shift keying;

the first DFT performed on samples of the respective channel signal, limited to samples for the respective epoch of the PN sequence period, is limited to samples corresponding to one respective chip in the PN sequence encoded in the respective channel signal; and the second DFT performed on a portion of the local copy of the PN code corresponding to the respective channel and the epoch is limited to samples for the respective epoch of the PN sequence period for only $N$ chips in the local copy of the PN code, including the one respective chip corresponding to the respective epoch and one or more chips offset from the one respective chip in the local copy of the PN code, wherein $N$ is an integer no greater than 261.

Performing the first DFT on samples of the respective channel signal, limited to samples for the respective epoch of the PN sequence period, to produce the first result includes loading a first buffer with the samples for the respective epoch of the PN sequence period, and padding a remainder of the first buffer with zeroes.

The first buffer has a size that is less than or equal to a size of the first DFT.

The DFT used to analyze samples of the respective channel signal is implemented in DFT hardware circuitry for performing DFT computations.

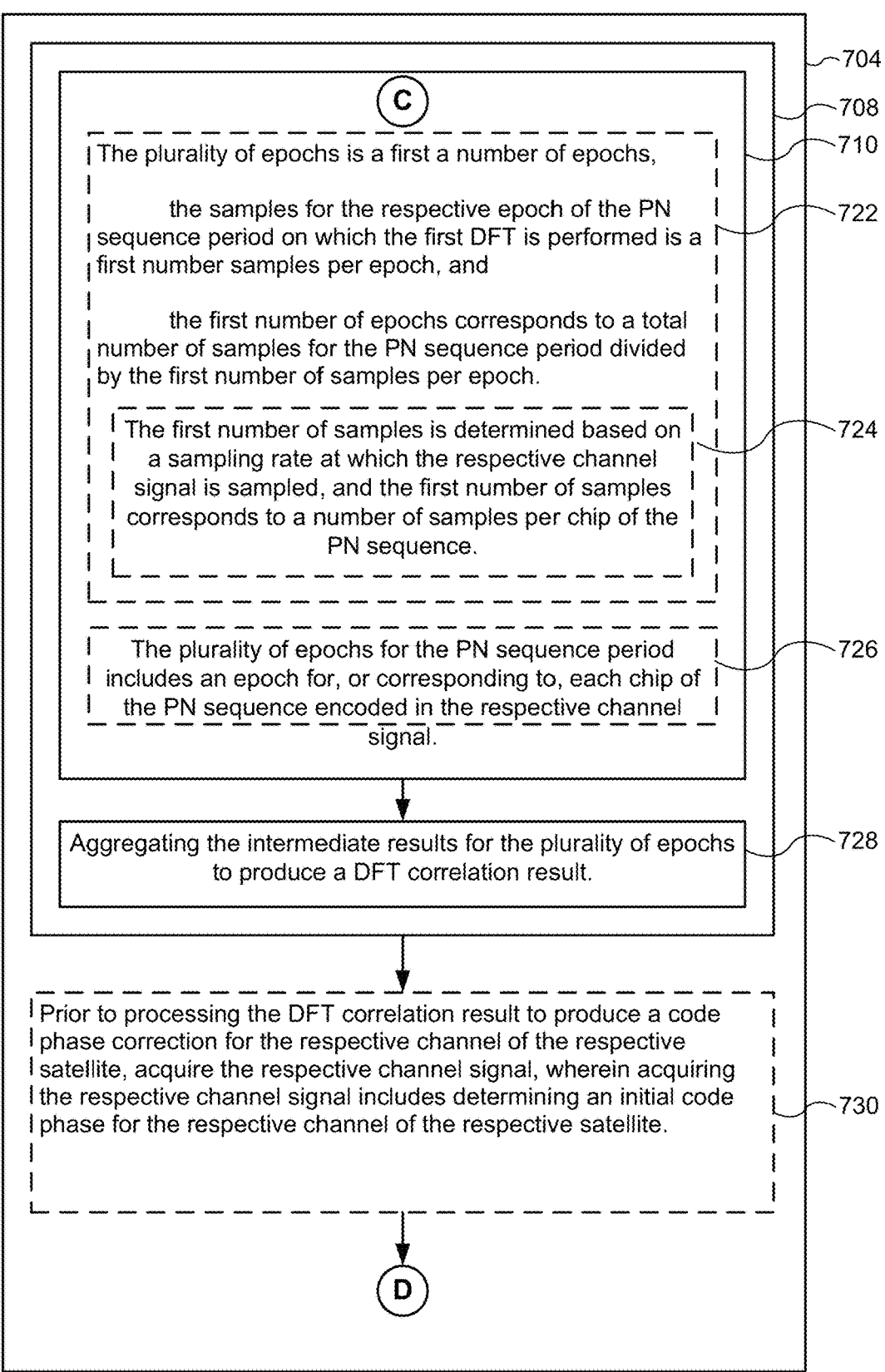

C

The plurality of epochs is a first a number of epochs, the samples for the respective epoch of the PN sequence period on which the first DFT is performed is a first number samples per epoch, and the first number of epochs corresponds to a total number of samples for the PN sequence period divided by the first number of samples per epoch.

The first number of samples is determined based on a sampling rate at which the respective channel signal is sampled, and the first number of samples corresponds to a number of samples per chip of the PN sequence.

The plurality of epochs for the PN sequence period includes an epoch for, or corresponding to, each chip of the PN sequence encoded in the respective channel signal.

Aggregating the intermediate results for the plurality of epochs to produce a DFT correlation result.

Prior to processing the DFT correlation result to produce a code phase correction for the respective channel of the respective satellite, acquire the respective channel signal, wherein acquiring the respective channel signal includes determining an initial code phase for the respective channel of the respective satellite.

METHODS AND DEVICES FOR PERFORMING MINI-BATCH DISCRETE FOURIER TRANSFORMS FOR TRACKING SATELLITE SIGNALS

RELATED APPLICATIONS

This application claims priority to U.S. Provisional Patent Application No. 63/416,419, filed Oct. 14, 2022, which is hereby incorporated by reference in its entirety.

TECHNICAL FIELD

The disclosed embodiments relate generally to navigation systems that determine the position of a moveable object using navigation signals received from a plurality of satellites, and more methods and devices for tracking signals from such satellites.

BACKGROUND

Global Navigation Satellite Systems (GNSS), such as GPS, GLONASS, Galileo and BeiDou, are used in many applications. In a GNSS system, each satellite transmits a signal that identifies the satellite and allows a receiver to determine the time at which the signal was sent. To do so, a GNSS satellite transmits a pseudorandom code (also called a pseudorandom noise (PRN) or (PN) code). The pseudorandom code is, for example, a series of ones and zeroes that looks random, but in fact uniquely identifies the satellite. Using other data, such as ephemeris data and almanac data, that is encoded in the received signal, "on top of" the pseudorandom code, using various modulation schemes (e.g., BPSK, BOC), the receiver can determine the time at which the signal was sent by the satellite. Using signals received from four or more satellites, the receiver can determine its position (e.g., on Earth).

For this process to work, the GNSS receiver must "acquire" the satellite's signal. To acquire the signal, the GNSS receiver must determine or resolve several ambiguities, including the frequency of the received signal (e.g., the frequency at which so-called "chips" of the PRN code are received) and the offset to the PRN code (e.g., the phase of the PRN code). Thus, acquiring the satellite's signal includes, at the very least, determining the correct frequency (e.g., the chipping frequency) and code shift (sometimes called a code offset) of the satellite signal, as received at the receiver. The conventional way to do so is to guess-and-check: the receiver uses all of the possible "frequency hypotheses" and "code shift hypotheses" until the correct combination is found.

After acquiring the satellite's signal, the GNSS receiver must then "track" the satellite's signal. In conventional systems, it is unrealistic to perform discrete Fourier transforms (DFTs) to track the satellite's signal due to the large computational burden of performing DFTs on an entire PRN code length. Thus, there is a need for systems and methods that can more quickly track GNSS satellite signals.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 7A-7E illustrate a flow chart of a method of tracking a signal from a satellite in a global navigation satellite system (GNSS), in accordance with some embodiments.

SUMMARY

Figure 1:
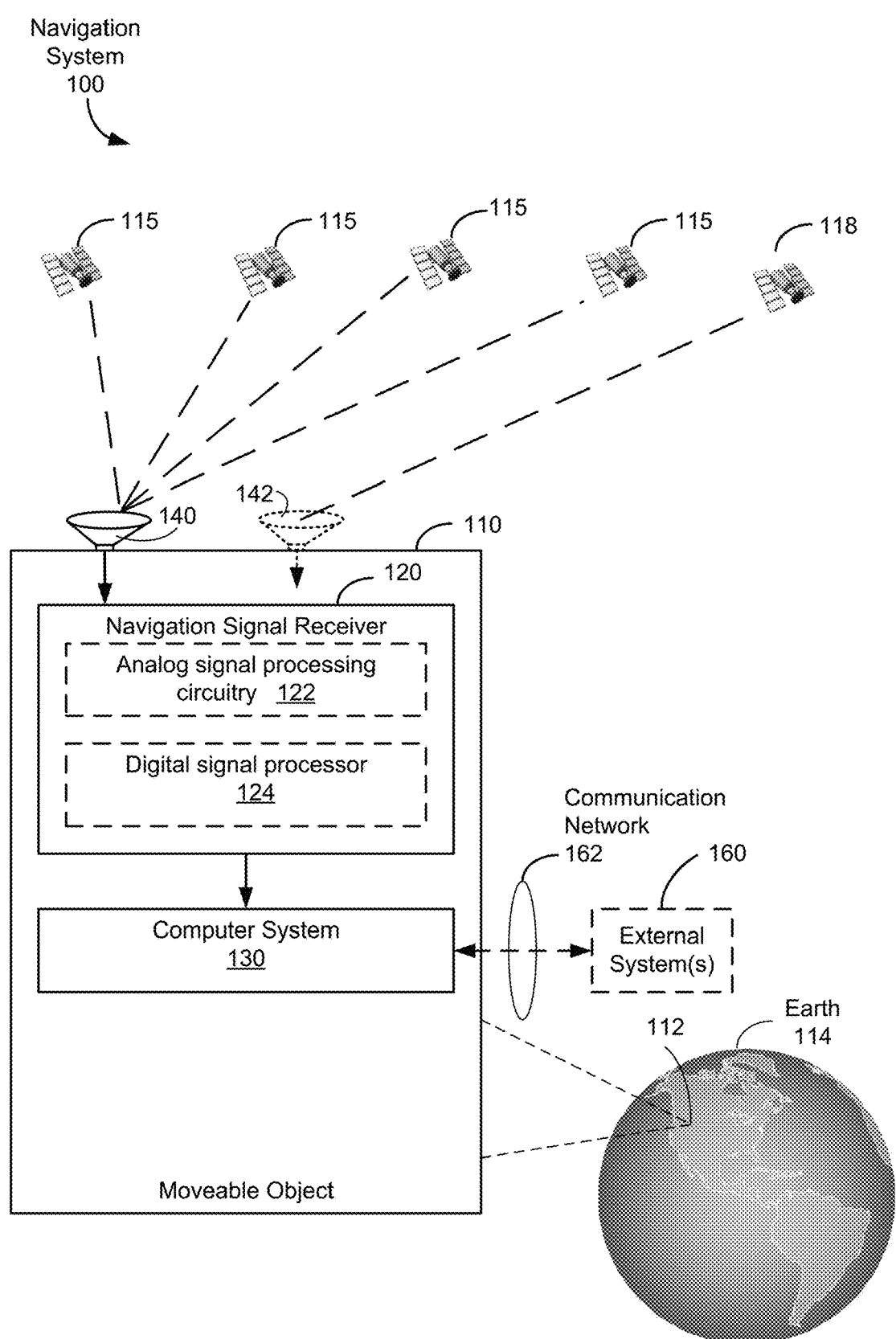
FIG. 1 is a block diagram illustrating a navigation system, according to some embodiments.

Some embodiments provide a system, computer readable storage medium storing instructions, or a method for tracking a signal from a satellite in a global navigation satellite system (GNSS). The method is performed at the mobile object, and includes receiving satellite navigation signals from a plurality of satellites including a respective channel signal for each respective channel of the satellite navigation signals received from a respective satellite of the plurality of satellites, each respective channel signal encoded with a pseudorandom number (PN) sequence having a sequence of chips. The method includes, for the respective channel signal: generating and aggregating intermediate results for a plurality of epochs of a single pseudorandom number (PN) sequence period of the PN sequence, including: for each respective epoch of the plurality of epochs, analyzing samples of the respective channel signal, limited to samples for the respective epoch of the PN sequence period, using a discrete Fourier transform (DFT), to produce an intermediate result for the respective epoch; and aggregating the intermediate results for the plurality of epochs to produce a DFT correlation result. The method includes, for the respective channel signal, processing the DFT correlation result to produce a code phase correction for the respective channel of the respective satellite. The method includes, in accordance with the code phase correction, computing position and velocity estimates for the mobile object; and performing a navigation function (e.g., routing of the mobile object; displaying on a map one or more suggested routes for moving the mobile object from a current location to a specified or target location; and/or providing information regarding locations nearby the mobile object or along a propose route of the mobile object) for the mobile object in accordance with the computed position and velocity estimates for the mobile object.

In some embodiments, analyzing samples of the respective channel signal to produce an intermediate result for the respective epoch comprises: performing a first DFT on samples of the respective channel signal, limited to samples for the respective epoch of the PN sequence period, to produce a first result; obtaining a second result corresponding to a second DFT performed on a portion of a local copy of a pseudorandom number (PN) code corresponding to the respective channel and the epoch; and multiplying the first result and the second result to produce the intermediate result for the respective epoch.

In some embodiments, the respective channel of the satellite navigation signals received from a respective satellite of the plurality of satellites is modulated with the PN sequence using binary phase shift keying. In some embodiments, the first DFT performed on samples of the respective channel signal, limited to samples for the respective epoch of the PN sequence period, is limited to samples corresponding to one respective chip in the PN sequence encoded in the respective channel signal. In some embodiments, the second DFT performed on a portion of the local copy of the PN code corresponding to the respective channel and the respective epoch is limited to samples for the respective epoch of the PN sequence period for only N chips in the local copy of the PN code, including one respective chip corresponding to the respective epoch and one or more chips offset from the one respective chip in the local copy of the PN code, wherein N is an integer no greater than 7 (e.g., N=3).

In some embodiments, the respective channel of the satellite navigation signals received from a respective satellite of the plurality of satellites is modulated with the PN sequence using code shift keying. In some embodiments, the first DFT performed on samples of the respective channel signal, limited to samples for the respective epoch of the PN sequence period, is limited to samples corresponding to one respective chip in the PN sequence encoded in the respective channel signal. In some embodiments, the second DFT performed on a portion of the local copy of the PN code corresponding to the respective channel and the respective epoch is limited to samples for the respective epoch of the PN sequence period for only N chips in the local copy of the PN code, including one respective chip corresponding to the respective epoch and one or more chips offset from the one respective chip in the local copy of the PN code, wherein N is an integer no greater than 261.

In some embodiments, processing the DFT correlation result comprises: performing an inverse discrete Fourier transform (IDFT) on the DFT correlation result to produce a time domain correlation and determining, based on the time domain correlation, a code phase correction for a tracking loop corresponding to the respective channel of the satellite navigation signals received from the respective satellite of the plurality of satellites.

In some embodiments, performing the first DFT on samples of the respective channel signal, limited to samples for the respective epoch of the PN sequence period, to produce the first result includes loading a first buffer with the samples for the respective epoch of the PN sequence period, and padding a remainder of the first buffer with zeroes.

In some embodiments, the first buffer has a size that is less than or equal to a size of the first DFT.

In some embodiments, the plurality of epochs is a first a number of epochs, the samples for the respective epoch of the PN sequence period on which the first DFT is performed is a first number samples per epoch, and the first number of epochs corresponds to a total number of samples for the PN sequence period divided by the first number of samples per epoch.

In some embodiments, the first number of samples is determined based on a sampling rate at which the respective channel signal is sampled, and the first number of samples corresponds to a number of samples per chip of the PN sequence.

In some embodiments, the plurality of epochs for the PN sequence period includes an epoch for, or corresponding to, each chip of the PN sequence encoded in the respective channel signal.

In some embodiments, the DFT used to analyze samples of the respective channel signal is implemented in DFT hardware circuitry for performing DFT computations.

In some embodiments, the method includes, prior to processing the DFT correlation result to produce a code phase correction for the respective channel of the respective satellite, acquiring the respective channel signal (satellite navigation signal) corresponding to the respective channel, wherein acquiring the respective channel signal includes determining an initial code phase for the respective channel of the respective satellite.

In some embodiments, the method includes acquiring the satellite navigation signal corresponding to the respective channel, wherein acquiring the satellite navigation signal corresponding to the respective channel includes determining a frequency and an initial code phase for the respective channel of the respective satellite. In some embodiments, the method includes, after acquiring the satellite navigation signal corresponding to the respective channel, tracking the satellite navigation signal corresponding to the respective channel so as to maintain a local replica of the satellite navigation signal corresponding to the respective channel that is within one-tenth of a chip of the satellite navigation signal corresponding to the respective channel, wherein tracking the satellite navigation signal corresponding to the respective channel includes: said generating and aggregating intermediate results for a plurality of epochs of a single PN sequence period, and said processing of the DFT correlation result to produce a code phase correction for the respective channel of the respective satellite.

In some embodiments, the method includes producing, in real time, a respective code phase correction for each successive PN sequence period of the respective channel signal, thereby producing respective code phase corrections for successive PN sequence periods of the respective channel signal.

In some embodiments, a navigation module for a mobile object is provided that includes one or more processors; a satellite receiver to receive satellite navigation signals from a plurality of satellites and produce a code phase correction for a respective channel of a respective satellite from which satellite navigation signals are received, using any of the methods described herein, and memory storing instructions that, when executed by the one or more processors, cause the navigation module for the mobile object to compute position and velocity estimates for the mobile object in accordance with the code phase correction, and perform a navigation function for the mobile object in accordance with the computed position and velocity estimates for the mobile object.

In some embodiments, a navigation module for a mobile object is provided that includes one or more processors and means for performing any of the methods described herein.

In some embodiments, a non-transitory computer-readable storage medium is provided that stores instructions which, when executed by a navigation module, or global navigation satellite system (GNSS) receiver, that includes one or more processors, cause the navigation module or GNSS receiver to perform the any of the methods described herein.

DESCRIPTION OF EMBODIMENTS

FIG. 1 is a block diagram illustrating a navigation system 100, according to some embodiments. Navigation system 100 enables a moveable object 110 (e.g., a phone, specialized GNSS receiver, a boat, a truck or other vehicle, a farming appliance, mining appliance, drilling system, etc.) to determine, at any point of time, its current position 112 with respect to a global coordinate system (e.g., a coordinate system for Earth 114). Moveable object 110 is equipped with a satellite receiver (navigation signal receiver 120), typically including or coupled to one or more satellite antennas 140, to receive satellite navigation signals from at least four satellites 115 that are orbiting Earth. The satellite navigation signals received by moveable object 110 are typically global navigation satellite system (GNSS) signals. Tables 1-2 below provides examples of GNSS signals from exemplary GNSS systems.

TABLE 1

| Signal Type | PRN Period (ms) | T Data/SC Period (ms) | PRN Length (chips) | Chipping Rate (MCPS) |
|---|---|---|---|---|
| GPS-C/A | 1 | 20 | 1023 | 1.023 |
| GPS-L1C | 10 | 10 | 10230 | 1.023 |
| BD-B1I | 1 | 1 | 2046 | 2.046 |
| BD-B1C | 10 | 10 | 10230 | 1.023 |
| GAL-E1B | 4 | 4 | 4092 | 1.023 |
| GAL-E1C | 4 | 1 | 4092 | 1.023 |
| GLN-G1C | 1 | 10 | 511 | 0.511 |

TABLE 2

| Signal Type | Modulation Type | Req Fs (MHz) | Min Length (ms) |
|---|---|---|---|
| GPS-C/A | BPSK | 2.046 | 2 |
| GPS-L1C | TMBOC(6,1,1/11) | 4.092 | 20 |
| BD-B1I | BPSK | 4.092 | 2 |
| BD-B1C | BOC(1,1) | 4.092 | 20 |
| GAL-E1B | CBOC(6,1) | 4.092 | 8 |
| GAL-E1C | CBOC(6,1)-c | 4.092 | 8 |
| GLN-G1C | BPSK | 4.092 | 2 |

In Tables 1-2 above, signal type refers to the various signals provided by the various GNSS systems (e.g., GPS-C/A is the GPS coarse acquisition signal), PRN period is the length of time for a complete instance of the PRN code (in milliseconds), T is the length of time, in milliseconds, over which a single bit of data is encoded (in milliseconds), and is also the minimum length of time between signal value transitions due to either secondary code (SC) modulation or data modulation or both, PRN length is the number of chips in a complete instance of the PRN code, and the chipping rate is the rate at which the chips are transmitted (in millions of chips per second (MCPS)). The rate at which the chips are transmitted may differ from the rate at which they are received based on, e.g., the Doppler effect and other effects. The minimum length, in milliseconds, shown in Table 2 is the minimum amount of sampled data needed, for each signal type, to ensure that the receiver can detect the beginning of a PRN sequence for that signal type.

Moveable object 110 optionally receives satellite orbit correction information and satellite clock correction information (sometimes collectively called "correction information") for the plurality of satellites. The correction information is typically broadcast by and received from one or more satellites 118 distinct from the GNSS satellites 115, using an antenna 142 and signal receiver 152 (see FIG. 2) distinct from antenna 140 and navigation signal receiver 120 used to receive the satellite navigation signals. However, in some embodiments, the same antenna and receiver are used to receive both satellite navigation signals and correction information.

Moveable object 110 determines a position of moveable object 110, using the received satellite navigation signals and, optionally, the received satellite orbit correction information and satellite clock correction information for the plurality of satellites. In some embodiments, received satellite navigation signals are processed by navigation signal receiver 120, including analog signal processing circuitry 122 and a digital signal processor 124, optionally taking into account the correction information, to determine code measurements and phase measurements for signals received from four or more satellites 115. Embedded computer system 130 determines the position of moveable object 110 based on those measurements.

Figure 2:
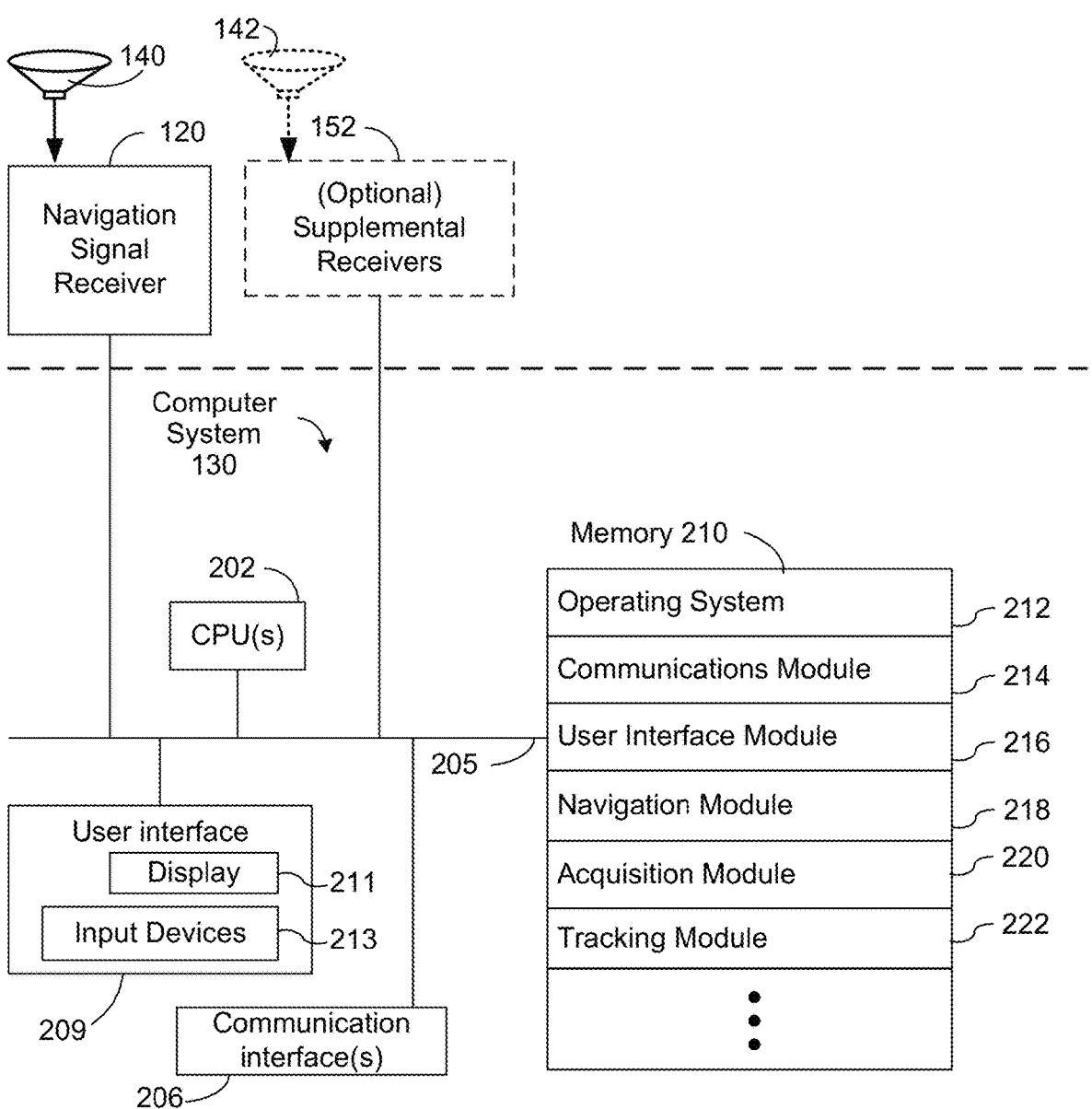
FIG. 2 is a block diagram of a computer system, such as a computer system that is part of a moveable object's navigation system, according to some embodiments.

FIG. 2 is a block diagram of computer system 130 in, and used by, a moveable object to determine the position of the moveable object, according to some embodiments.

Computer system 130 typically includes one or more processors (sometimes called CPUs, hardware processors) 202 for executing programs or instructions; memory 210; one or more communications interfaces 206; and one or more communication buses 205 for interconnecting these components. Computer system 130 optionally includes a user interface 209 comprising a display device 211 and one or more input devices 213 (e.g., one or more of a keyboard, mouse, touch screen, keypad, etc.) coupled to other components of computer system 130 by the one or more communication buses 205. Navigation signal receiver 120, and supplemental receiver(s) 152, if provided, are also coupled to other components of computer system 130 by the one or more communication buses 205. The one or more communication buses 205 may include circuitry (sometimes called a chipset) that interconnects and controls communications between system components.

Communication interface 206 (e.g., a receiver or transceiver) is used by computer system 130, and more generally moveable object 110, to convey information to external systems, and to receive communications from external systems.

Memory 210 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 210 optionally includes one or more storage devices remotely located from the CPU(s) 202. Memory 210, or alternately the non-volatile memory device(s) within memory 210, comprises a computer readable storage medium. In some embodiments, memory 210 or the computer readable storage medium of memory 210 stores the following programs, modules and data structures, or a subset thereof:

an operating system 212 that includes procedures for handling various basic system services and for performing hardware dependent tasks;

a communications module 214 that operates in conjunction with communication interface 206 (e.g., a receiver and/or transceiver) to handle communications between moveable object 110 and external systems 160 (FIG. 1); the connection between computer system 130 and external systems 160 may include a communication network 162, such as the internet or a public or proprietary wireless network;

optionally, a user interface module 216 for receiving information from one or more input device 213 of user interface 209, and to convey information to a user of moveable object 110 via one or more display or output devices 211;

a navigation module 218 for determining a position of the moveable object and performing one or more navigation functions (e.g., routing of the mobile object; displaying on a map one or more suggested routes for moving the mobile object from a current location to a specified or target location; and/or providing information regarding locations nearby the mobile object or along a propose route of the mobile object);

an acquisition engine 220 for acquiring satellite signals from GNSS satellites, including determining a tracking frequency and a code shift (sometimes called a code offset) for each of several respective GNSS satellites, or for managing operation of an acquisition engine that is implemented, at least in part, in digital signal processor 124;

a tracking module 222, sometimes called the satellite signal tracking module, which tracks GNSS satellite signals using acquisition information (e.g., the tracking frequency and code shift) handed over from the acquisition module 220, or for managing operation of a tracking module that is implemented, at least in part, in digital signal processor 124. For example, in some embodiments, tracking module 222 samples a GNSS satellite signal using a tracking frequency and code shift initially determined by the acquisition module 220, and then adjusted by the tracking module itself as the tracking module determines code phase corrections for respective channels of the received satellite navigation signals.

Operating system 212 and each of the above identified modules and applications correspond to a set of instructions for performing a function described above. The set of instructions can be executed by the one or more processors 202 of computer system 130. The above identified modules, applications or programs (i.e., sets of instructions) need not be implemented as separate software programs, procedures or modules, and thus various subsets of these modules may be combined or otherwise re-arranged in various embodiments. In some embodiments, memory 210 stores a subset of the modules and data structures identified above. Furthermore, memory 210 optionally stores additional modules and data structures not described above.

FIG. 2 is intended more as a functional description of the various features which may be present in a computer system 130 of a moveable object 110 than as a structural schematic of the embodiments described herein. In practice, and as recognized by those of ordinary skill in the art, items shown separately could be combined and some items could be separated. For example, some items shown separately in FIG. 2 could be combined into a single module or component, and single items could be implemented using two or more modules or components. The actual number of modules and components, and how features are allocated among them will vary from one implementation to another.

In addition, in some embodiments, some or all of the above-described functions may be implemented with hardware circuits (e.g., which may comprise graphics processors for efficiently performing discrete Fourier transforms (DFTs), field programmable gate arrays (FPGAs), application specific integrated circuits (ASICs), a "system on a chip" that includes processors and memory, or the like). To that end, in some embodiments, CPUs 202 include specialized hardware for performing these and other tasks. In some embodiments, these operations are performed by navigation signal receiver 120 rather than computer system 130.

Figure 3:
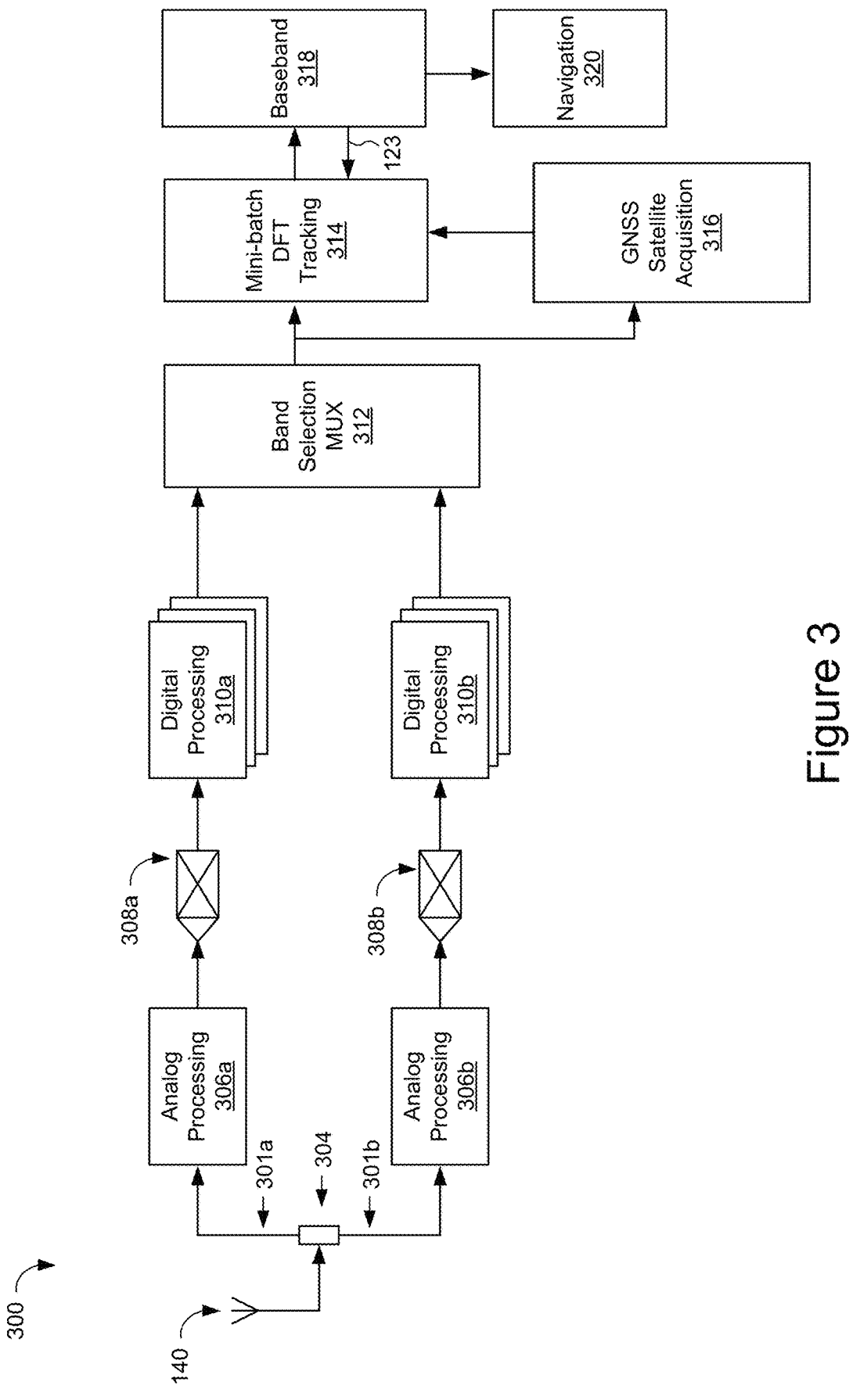
FIG. 3 is a block diagram of a GNSS receiver, in accordance with some embodiments.

FIG. 3 is a block diagram of a GNSS receiver 300, in accordance with some embodiments. An antenna 140 receives a GNSS signal from a satellite (e.g., satellite 115, FIG. 1). In some embodiments, antenna 140 receives a GNSS signal from each of a plurality of satellites (e.g., four or more satellites in a respective constellation of satellites). In some embodiments, antenna 140 receives a GNSS signal from a plurality of satellites from a plurality of different constellations (e.g., receives GPS signals, GLONASS signals, and/or BeiDou signals). Thus, in some embodiments, GNSS receiver 300 is a multi-constellation multi-frequency (MCMF) receiver. The signals received from antenna 140 are amplified by a low-noise amplifier 304 and passed to both a high frequency channel 301*a* and a low frequency channel 301*b*.

Channels 301*a* and 301*b* include analog processing circuitry 306*a* and 306*b*, respectively. In some embodiments, the analog processing circuitry 306*a* includes a high-band radio-frequency (RF) to intermediate-frequency (IF) analog chain, which may include one or more filters and a variable gain amplifier. In some embodiments, the analog processing circuitry 306*b* includes a low-band radio-frequency (RF) to intermediate-frequency (IF) analog chain, which may include one or more filters and a variable gain amplifier.

Channels 301*a* and 301*b* include analog to digital converters (ADC) 308*a* and 308*b*, respectively. In some embodiments, ADCs 308*a* and 308*b* sample the GNSS signal at a first sampling rate (e.g., 40.92 MHz). In some embodiments, the first sampling rate is a multiple (e.g., an integer multiple) of a chipping rate of the GNSS signal.

Channels 301*a* and 301*b* include digital processing circuitry 310*a* and 310*b*, respectively. In some embodiments, the digital processing circuitry 310*a* and 310*b* include digital band or sub-band selective filtering.

The filtered signals produced by the digital processing circuitry 310*a* and 310*b* of channels 301*a* and 301*b*, respectively, are passed to band selection multiplexer (MUX) 312, and the respective selected channel signals output by the band selection multiplexer are passed to both a mini-batch DFT tracking engine 314 (e.g., a GNSS satellite tracking engine that uses mini-batch DFTs, as described in more detail below) and a GNSS satellite acquisition engine 316. For now, it suffices to say that the GNSS satellite acquisition engine 316 determines parameters needed by mini-batch DFT tracking engine 314 for tracking satellites, such as a code shift and a frequency (e.g., chipping frequency), and the mini-batch DFT tracking engine 314 performs mini-batch DFTs and other processing, described below, to determine a code offset for aligning a local copy of a PN sequence with the PN sequence embedded in a respective channel signal. In some embodiments, and typically, multiple instances of the mini-batch DFT tracking engine 314 are included in the GNSS receiver 300. For example, to track N different channel signals, the GNSS receiver 300 includes N instances of the mini-batch DFT tracking engine 314. Furthermore, pseudorange information (e.g., measurements of the distance between the receiver 300 and each satellite in a set of four or more satellites that are in view of the receiver 300) determined by the baseband tracking module 318 (with assistance from mini-batch DFT tracking engine 314) is what is used to determine the location of the receiver 300.

To support various modulation types used by the GNSS system, the tracking module 314 typically contains one or multiple carrier phase demodulators, a PN code generator sampled at multiple delayed phases, a binary offset sub-carrier (BOC) modulator (used for modern GNSS signals such as GPS L1C, BeiDou B1C, Galileo E1 signals etc.), and multiple accumulators or a mini-batch DFT, to create a bank of in-phase (I) and quadrature (Q) measurements at an interval of millisecond (ms) or multiple milliseconds to drive the baseband tracking module 318.

The navigation module 320 takes the pseudorange and carrier phase measurements and other related information from the satellites to generate the positioning solution (e.g., computed position and velocity estimates for the moveable object), which is used as a feedback to align the receiver crystal-grade clock with the satellite-based atomic grade clock; the solution also, combined with other information, generates the in-view satellites list to control the appropriate receiver resource allocation.

Figure 4:
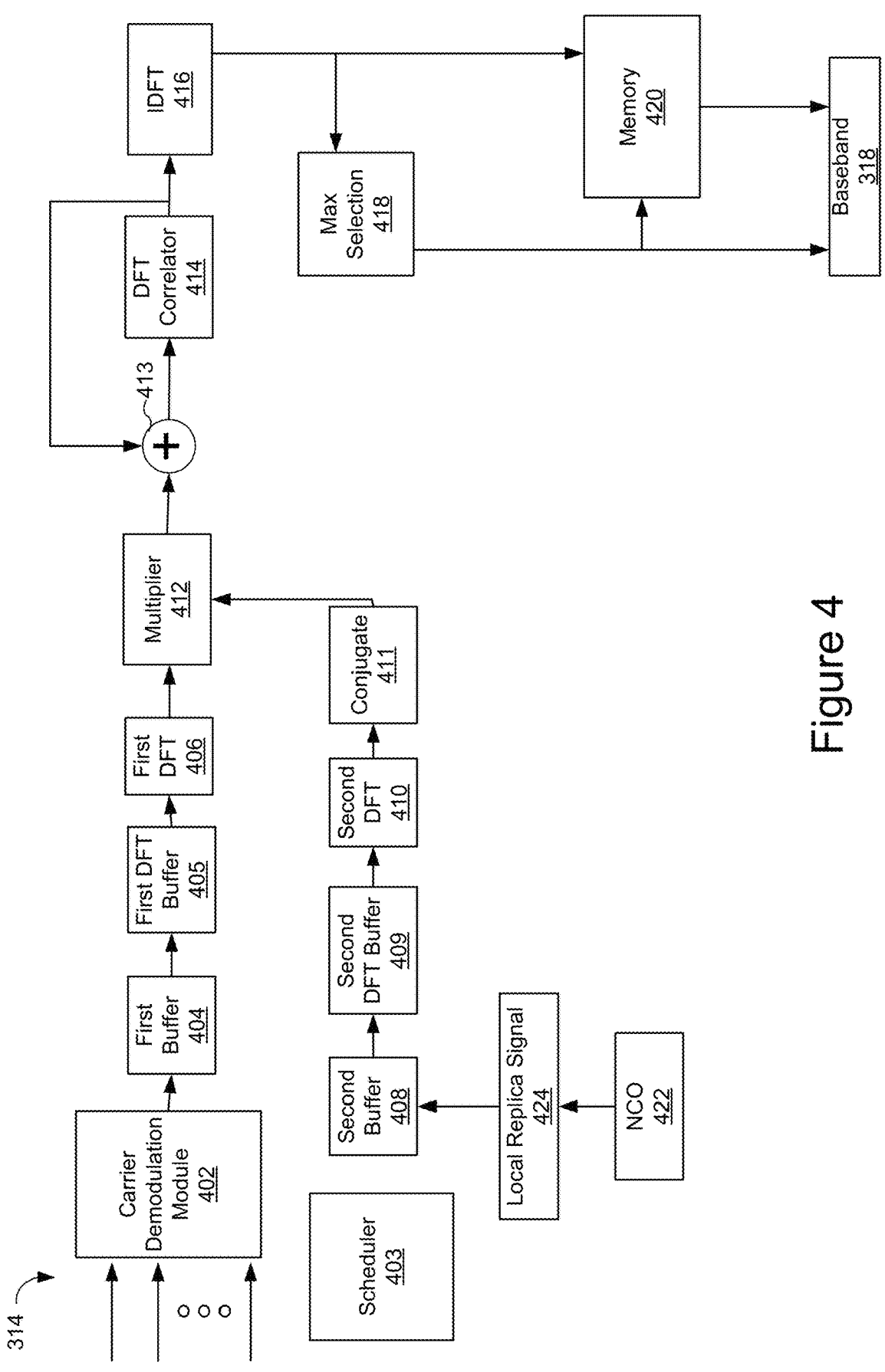
FIG. 4 is a block diagram of a tracking engine in a GNSS receiver, in accordance with some embodiments.

FIG. 4 is a block diagram of mini-batch DFT tracking engine 314 in a GNSS receiver (e.g., navigation signal receiver 120), in accordance with some embodiments. In some embodiments, the mini-batch DFT tracking engine 314 includes the sub-components described below. For example, a mini-batch DFT approach which decouples the DFT length from the PN sequence length is provided. As used herein, the DFT is a fast Fourier transform (FFT). It will be understood that the use of DFT and FFT are interchangeable in the examples described herein. The DFT length depends on the targeted range of PN phase offset between the received PN sequence and the local replica sequence, the reduction ratio can be calculated by:

$$R = \mathrm{ROUND}(\beta L_{PN})/2 \cdot \mathrm{ROUND}(\beta L_{CORR}) \qquad \text{(Equation 1)}$$

where,
  $\beta$ denotes the number of samples per chip,
  $L_{PN}$ denotes the length of the sequence in chips,
  $L_{CORR}$ denotes the range of the correlations in chips,
  $\mathrm{ROUND}(x)=2^{\lceil log_2 x \rceil}$ denotes a function to achieve a minimum integer with power of 2 that is greater or equal to x,
  2• denotes that the mini-batch DFT requires that the length of the first buffer 404 and the second buffer 408 is twice of the $\mathrm{ROUND}(\beta L_{CORR})$.
  R denotes the multiple of reduction between the regular DFT and the mini-batch DFT.

In some embodiments, the initial estimated code phase and carrier phase signal (e.g., obtained during acquisition) is used to initialize the mini-batch DFT tracking module 314. The baseband tracking module 318 takes a set of correlation signals from the mini-batch DFT module 314, derives the code error and carrier error (sometimes called code offset and carrier offset), and updates the receiver estimated code and carrier frequencies to align with the code and carrier frequencies of the received signal. For example, the feedback frequency signals drive a code NCO (Numerically Controlled Oscillator) 422 and/or multiple carrier NCOs to demodulate the received samples for the next PN sequence period. As such, the mini-batch DFTs calculate code errors (code offsets) in real-time and the mobile object is enabled to correct for code phase errors before receiving samples for the next PN sequence period.

A carrier demodulation module 402 translates the received signal from Band Selection MUX 312 (FIG. 3) to zero frequency based on a local carrier frequency estimation. In some embodiments, a carrier frequency signal drives a carrier NCO to create a carrier phase signal, which is the index to a sine and cosine loop-up table. The resulting complex sequence is used by a complex multiplier in the carrier demodulation module 402 to remove the residual carrier embedded in the signal. The ideal zero frequency signal is fed into the first buffer 404 to start the mini-batch process.

To generate a set of correlation signals for baseband tracking module 318, in some embodiments, a scheduler 403 divides the correlation process into five stages: sample buffering, buffer latch, DFT execution and accumulation, IDFT execution, and peak identification and correlation latch. The scheduler 403 initiates each of the five stages of the correlation process.

The sub-components of the mini-batch DFT tracking engine 314 are used to decrease the DFT size, thus achieving the feasibility of using DFT to implement frequency domain tracking loops. The first buffer 404 stores the received zero frequency sample signal from the carrier demodulation module 402. The second buffer 408, working as right shift registers, stores the local replica signal 424. In some embodiments, however, local replica signal 424, second buffer 408, second DFT buffer 409, second DFT 410 and conjugate module 411 are replaced by a table lookup module that obtains precomputed conjugates of the DFT of respective portions of a local replica signal 424 corresponding to the channel signal being processed by the mini-batch DFT tracking engine 314.

In some embodiments, the buffer size can be selected as:

$$N_{BUF} = 2 \cdot \mathrm{ROUND}(\beta L_{CORR}) \qquad \text{(Equation 2)}$$

where
  $\beta$ denotes the number of samples per chip,
  $L_{CORR}$ denotes the range of the interested correlation in chips,
  $\mathrm{ROUND}(x)=2^{\lceil log_2 x \rceil}$ denotes a function to achieve a minimum integer with power of 2 that is greater or equal to x, and
  $N_{BUF}$ denotes the size of the first buffer 404 and the second buffer 408 in samples.

The number of samples per mini-batch DFT ($L_{LOAD}$) can be selected by:

$$\mathrm{max} N_{LOAD} \qquad \text{(Equation 3)}$$
$$\text{s.t. } \begin{cases} N_{LOAD} \mid \beta L_{PN} \\ N_{LOAD} \leq 0.5 \cdot N_{BUF} \end{cases}$$

where,
  $N_{LOAD}$ denotes the number of new samples buffered for each DFT,
  $\beta$ denotes the number of samples per chip,
  $L_{PN}$ denotes the length of the PN sequence in chips,
  $N_{BUF}$ denotes size of the first buffer 404 and the second buffer 408 in samples, which is also the size of each DFT.
  A|B denotes that the first integer of A is divided by the second integer of B (e.g., where A is a factor of B).

The following example uses parameters of L1-CA applied to the above Equations 1-3, to illustrate the DFT size reduction using the mini-batch approach described herein. For example, the sample rate is 40.92 MHz ($\beta$=40 samples) for each L1-CA chip (e.g., for a respective epoch, there are 40 samples per chip). The length of the L1-CA sequence is 1023 chips, wherein. $\beta \cdot L_{PN} = 40920$. According to Equation 1, ROUND($\beta \cdot L_{PN}$)=65536. During the tracking loop pull in or locked mode, the PN code phase offset between the receiver signal and the local replica signal is within +/−1 chips (e.g., +/−40 samples); therefore, the range of code offset is $L_{CORR}$=3 chips ($N_{CORR} = \beta L_{CORR}$=120). According to Equation 1, ROUND($N_{CORR}$)=128. As a result, the DFT size is reduced by 512 ($2^{16}/2^7$) times.

According to Equation 2, the size of the first buffer 404 and the second buffer 408 is 2 ROUND($\beta L_{CORR}$)=256, which is the size of the DFT to be computed during each epoch of the process for analyzing samples of the channel signal. Compared with the DFT size of $2^{17}$ for a regular size DFT, the 256-point DFT is significantly more efficient and manageable to be implemented on a FPGA (Field Programmable Gate Array) or ASIC (Application Specific Integrated Circuit).

According to Equation 3, the $N_{LOAD}$ for L1-CA with 40 samples per chip is no greater than 128 and a factor of $N_{PN} = \beta L_{PN}$=40920, and thus the maximum of $N_{LOAD}$ is 120 (e.g., once 120 samples are counted, a new mini-batch DFT is executed).

To easily quantify the size reduction of using the mini-batch DFT vs. the regular DFT, this embodiment assumes (1) a sampling frequency of $4F_0$, where $F_0$ represents GNSS standard base frequency of 10.23 MHz; (2) the range of the code phase offset is +/−1 chip which is good enough for code tracking for signals modulated using BPSK or BOC. Based on the assumptions, Table 3 illustrates an example of DFT size reduction using the mini-batch DFT, as compared to a regular DFT size of the entire code length (e.g., for signals belonging to four major constellations). The last column of Table 3 shows that the size reduction ranges from a multiple of 128 (for short length PN sequence) to approximately a multiple of 1.05 million (for the long PN sequence).

$$K_{LAST} = \text{mod}(L_{PN} - 1 + \lfloor R_{NCO}(N_{BUF} -) \rfloor, L_{PN}) \qquad \text{(Equation 4)}$$

where, $K_{LAST}$ denotes the chip index that the last sample belongs to, $L_{PN}$ denotes the length of the PN sequence in chips, $R_{NCO}$ denotes code signal 123 in chips per sample, $N_{BUF}$ denotes the size of the first buffer 404 and the second buffer 408 in samples, $N_{LOAD}$ denotes the number of samples buffered to execute an DFT, and $\lfloor x \rfloor$ denotes the largest integer that does not exceed x.

A sample enable signal (from the scheduler) shifts received samples from the carrier demodulation module 402 into the first buffer 404, and at the same time, a local replica signal 424 (from the scheduler) shifts a portion of the local copy of the PN code into the second buffer 408.

Figure 6:
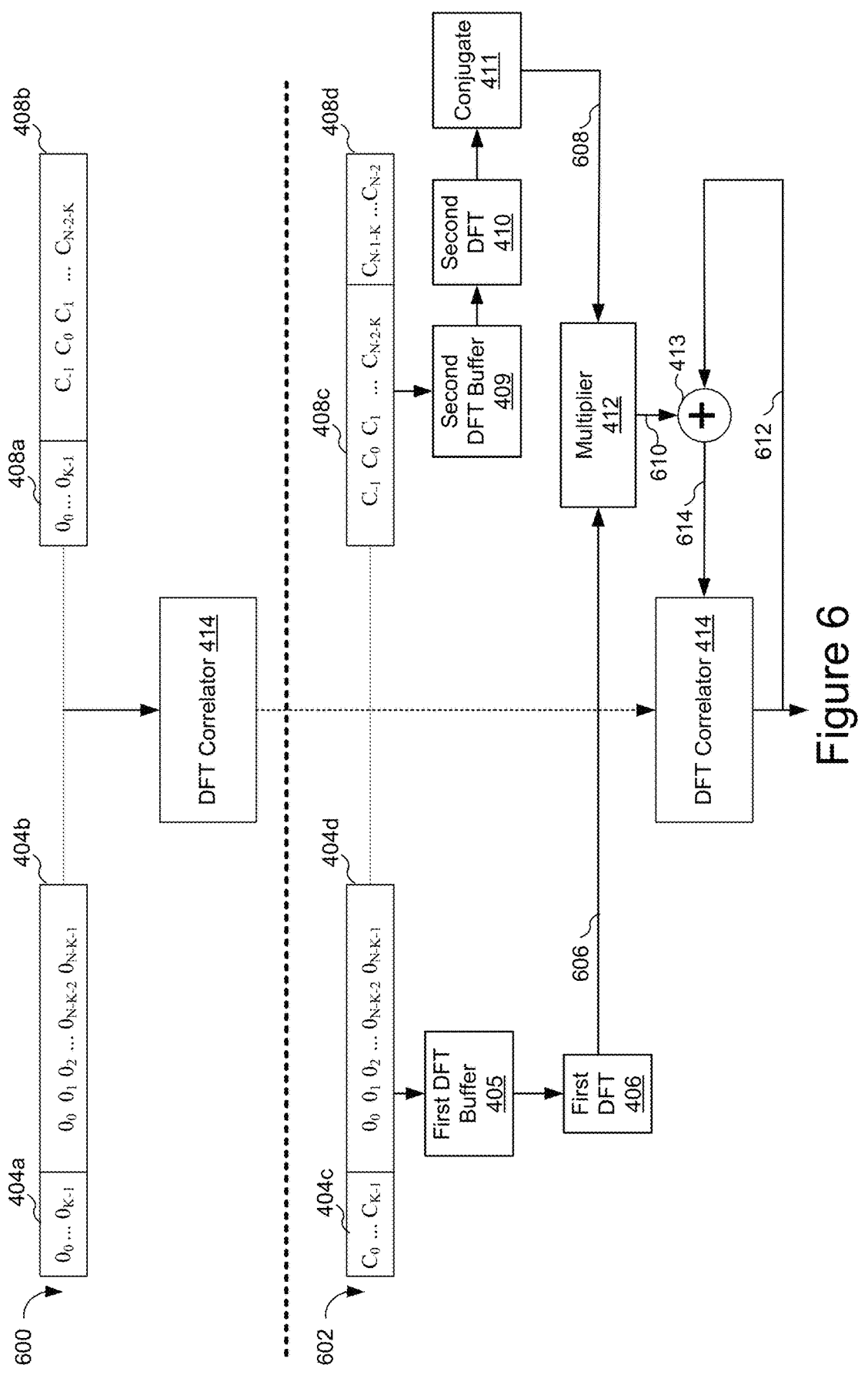
FIG. 6 is a block diagram of storing samples in a first buffer and a second buffer, in accordance with some embodiments.
Figure 7B:
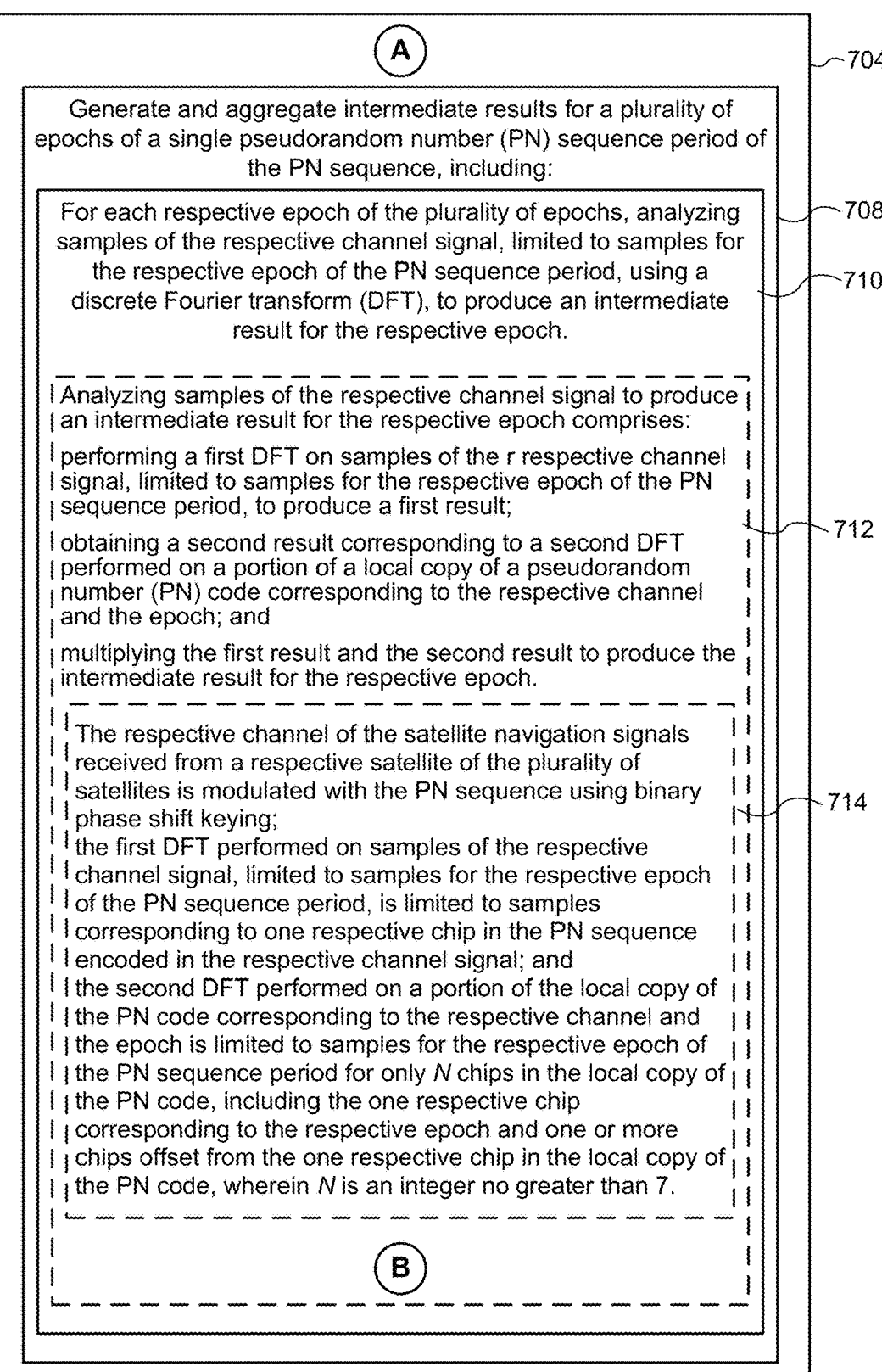
Figure 7E:
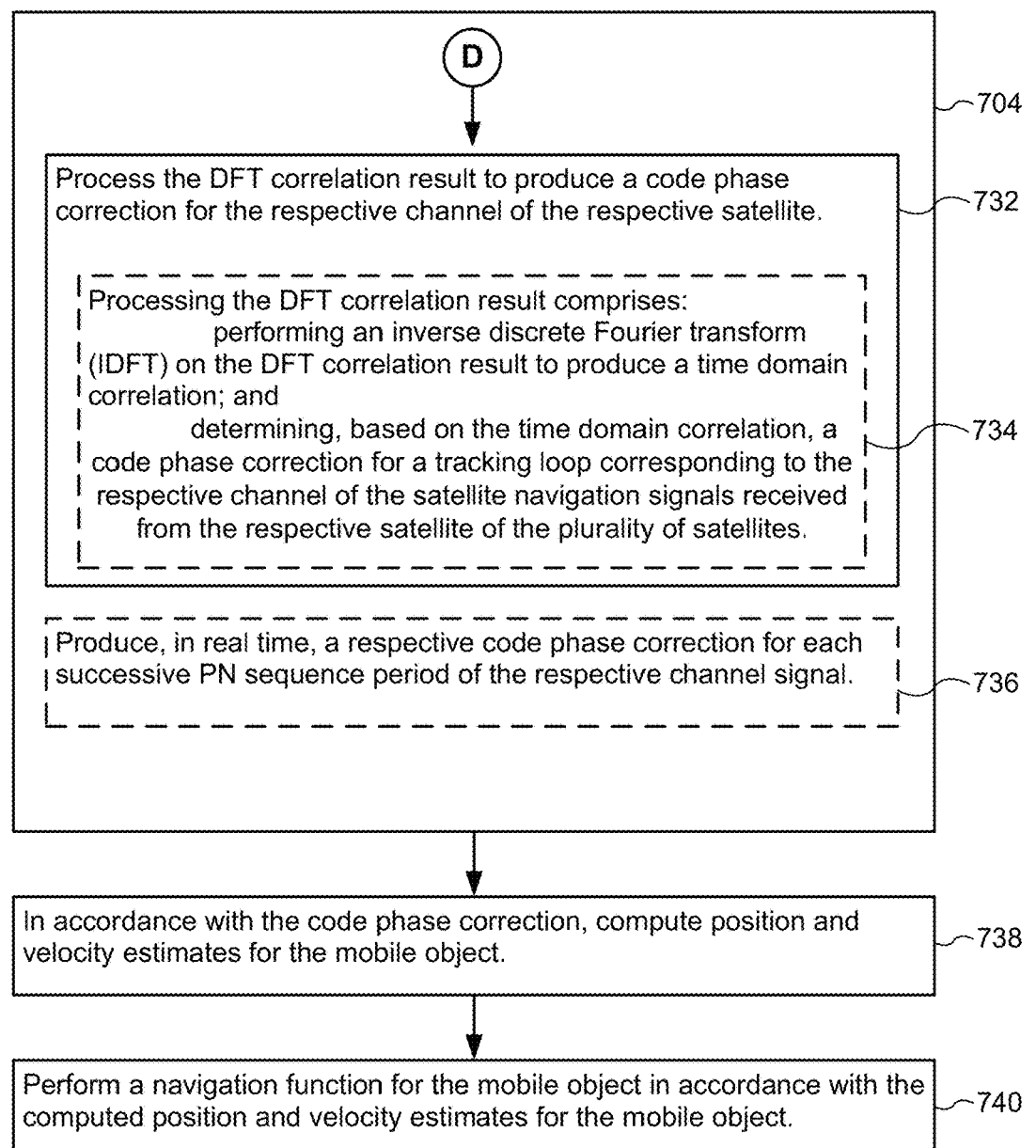

Once number of $N_{LOAD}$ samples shifts into the buffer, the scheduler provides a transfer enable signal that (1) shifts the samples in the first buffer 404 into the first DFT 405 and resets the first buffer 404 to zeroes; and (2) shifts the samples in the second buffer 408 into the second DFT buffer 409 (e.g., as illustrated in FIG. 6).

Once the data have been transferred into the first DFT buffer 405 and the second DFT buffer 409, (e.g., at a first epoch), the scheduler 403 provides a DFT enable signal to start the first $N_{BUF}$ point DFT 406 for the data stored in the first DFT buffer 405 and creates a first DFT result, and starts the second $N_{BUF}$ point DFT 410 for the data stored in second DFT buffer 409 and creates the second DFT result which passes through a conjugate operation 411 to generate the signal fed to multiply module 412.

TABLE 3

| Constellation | GNSS Signal | Chipping Rate | Code length | mini-Batch DFT size | regular DFT size | Reduction |
|---|---|---|---|---|---|---|
| GPS | L1-CA | 1023000 | 1023 | 256 | 65536 | 256 |
| GPS | L2CM | 511500 | 10230 | 512 | 1048576 | 2048 |
| GPS | L2CL | 511500 | 767250 | 512 | 67108864 | 131072 |
| GPS | L5 | 10230000 | 10230 | 32 | 65536 | 2048 |
| GLONASS | G1C | 511000 | 511 | 512 | 65536 | 128 |
| GLONASS | G2C | 511000 | 511 | 512 | 65536 | 128 |
| GLONASS | G1P | 5110000 | 5110 | 64 | 65536 | 1024 |
| GLONASS | G2P | 5110000 | 5110000 | 64 | 67108864 | 1048576 |
| GALILEO | E1 | 1023000 | 5110000 | 256 | 268435456 | 1048576 |
| GALILEO | E5A | 10230000 | 10230 | 32 | 65536 | 2048 |
| GALILEO | E5B | 10230000 | 10230 | 32 | 65536 | 2048 |
| BEIDOU | B1I | 2046000 | 2046 | 128 | 65536 | 512 |
| BEIDOU | B1C | 1023000 | 1023 | 256 | 65536 | 256 |
| BEIDOU | B2A | 10230000 | 10230 | 32 | 65536 | 2048 |
| BEIDOU | B3 | 10230000 | 10230 | 32 | 65536 | 2048 |

In some embodiments, a first mini-batch DFT correlation starts at a first epoch (e.g., epoch 600, FIG. 6), where a pre-load signal, from the scheduler, initializes the first buffer 404 with zeroes, the DFT correlator 414 with zeroes, and the second buffer 408 with $N_{BUF}-N_{LOAD}$ samples, as described with reference to FIG. 6. To satisfy a typical code tracking requirement, the first sample preloaded in the second buffer 408 is sampled from the last chip of the PN sequence, and the last sample belongs to the chip defined as:

The element-wise multiply module 412 multiplies the kth data from the first DFT 406 with the kth data from the conjugate of the second DFT 410 (to achieve the kth data of 610, where k ranges from 0 to ($N_{BUF}$−1). Accumulator 413 adds the accumulation signal output from DFT correlator 414 (e.g., the previous DFT correlations stored), to generate the new accumulation signal that is fed back into DFT correlator 414 for storage, as described with reference to FIG. 6.

At the time of DFT execution, the scheduler 403 provides an enable signal to continuously shift another $N_{LOAD}$ received signal samples from the carrier demodulation module 402 into the first buffer 404, and continuously shifts the new local replica signal 424 into the second buffer 408 for the next DFT.

In some embodiments, at a second epoch, the second $N_{LOAD}$ samples are buffered in the first buffer 404 and the second buffer 408. It repeats the above steps for the second batch of DFT (e.g., for the second epoch samples).

In some embodiments, at a final epoch (e.g., corresponding to a last chip in the PN sequence), the inverse discrete Fourier transform (IDFT) (e.g., or inverse fast Fourier transform (IDFT)) is triggered when the Mth DFT is completed where:

$$M = d \cdot \beta L_{MS}/N_{LOAD} \qquad \text{(Equation 5)}$$

where
  d is the number of milliseconds to iterate a baseband tracking loop update,
  β denotes the number of samples per chip,
  $L_{MS}$ denotes the number of chips per millisecond,
  $N_{LOAD}$ denotes the interval in samples between the first DFT execution and the second DFT execution.

In some embodiments, the scheduler 403 provides an IDFT enable signal to activate the IDFT module 416 to convert the frequency domain correlation, output by DFT correlator 414, into a time domain correlation. In some embodiments, the scheduler further causes the register (e.g., DFT correlator 414) to be reset, making it ready for the next (e.g., second) baseband loop iteration. Upon completing the IDFT calculation, a correlation latch enable signal from the scheduler 403 activates the maximum selection module 418, which selects the maximum value and corresponding index from a set of correlations located at multiple of β samples, where the correlations are located at rising edge of each chip, which can be represented by:

$$(X_P, IDX_P) = \text{argmax}\{C_0, C_\beta, C_{2\beta}, \dots, C_{L_{CORR}\beta}\} \qquad \text{(Equation 6)}$$

where,
  $C_{i\beta}$ denotes the correlation located at the rising edge of the ith chip,
  $X_P$ denotes the maximum value in the set of $\{C_0, C_\beta, C_{2\beta}, \dots, C_{L_{CORR}\beta}\}$, and
  $IDX_P$ denotes the index signal corresponding to the $X_P$.

In most of the cases, the code and carrier tracking process algorithm is interested in the correlations located within a small range with respect to the index signal ($IDX_P$); therefore an index selection module takes the peak index signal from maximum selection module 418, and the corresponding correlations are latched into the memory 420.

The baseband tracking module 318 uses the selected correlation signal to generate the updated carrier frequency and the updated code frequency.

In some embodiments, a next (e.g., second_baseband loop) iteration starts for a next (second) plurality of epochs, until the Mth DFT completes at a final epoch of the next (second) baseband loop iteration.

As an example to illustrate the equivalence between the mini-batch DFT (e.g., performed on one epoch at a time, for the entire PN sequence) and the regular DFT (e.g., performed on the entire PN sequence at once), if a PN sequence comprises 7 chips (e.g., Chip 1, Chip 2, Chip 3, Chip 4, Chip 5, Chip 6 and Chip 7), the regular DFT requires to buffer the whole sequence and correlates with a local replica of 7 chips long, which can be cyclically offset to the PN sequence in 7 possible chips. For example, the local replica sequence could be delayed by 1 chip with respect to the incoming sequence, could be delayed by 2 chips with respect to the sequence, could be delayed by 6 chips (or advanced by 1 chip) with respect to the incoming sequence, or could be offset (e.g., delayed or advanced) by another number of chips. However, typical code and carrier tracking only correct for offsets no larger than 1 chip delayed or 1 chip advanced (e.g., equivalent to a 6 chip delay in the case of a 7 chip PN sequence), also sometimes referred to as a late chip or an early chip with respect to the incoming sequence in the received channel signal. Therefore, other offsets (e.g., between 2 to 5 chip delay offsets for the 7 chip PN sequence), are not useful for code and carrier tracking, and performing a regular DFT on the entire PN sequence significantly increases the DFT block size, which complicates computation logic and slows down the processing speed.

Accordingly, the mini-batch DFT divides the one large batch of regular DFT (e.g., the PN sequence that is 7 chips long) into an accumulation of seven small batch of DFT (e.g., 7 epochs), each of which is 3 ($N_{BUF}/\beta$) chips long. In each mini-batch DFT (e.g., for each epoch), the incoming (received) sequence signal in the first buffer 404 (e.g., corresponding to one chip) is correlated with a local replica of the PN sequence that includes 3 chips of samples, sometimes called early, punctual and late chips, where the punctual chip (in the local replica of the PN sequence) corresponds to a current estimate of the code phase of the incoming (received), the early chip corresponds to the chip in the PN sequence immediately preceding the punctual chip, and the late chip corresponds to the chip in the PN sequence immediately following the punctual chip.

Figure 5:
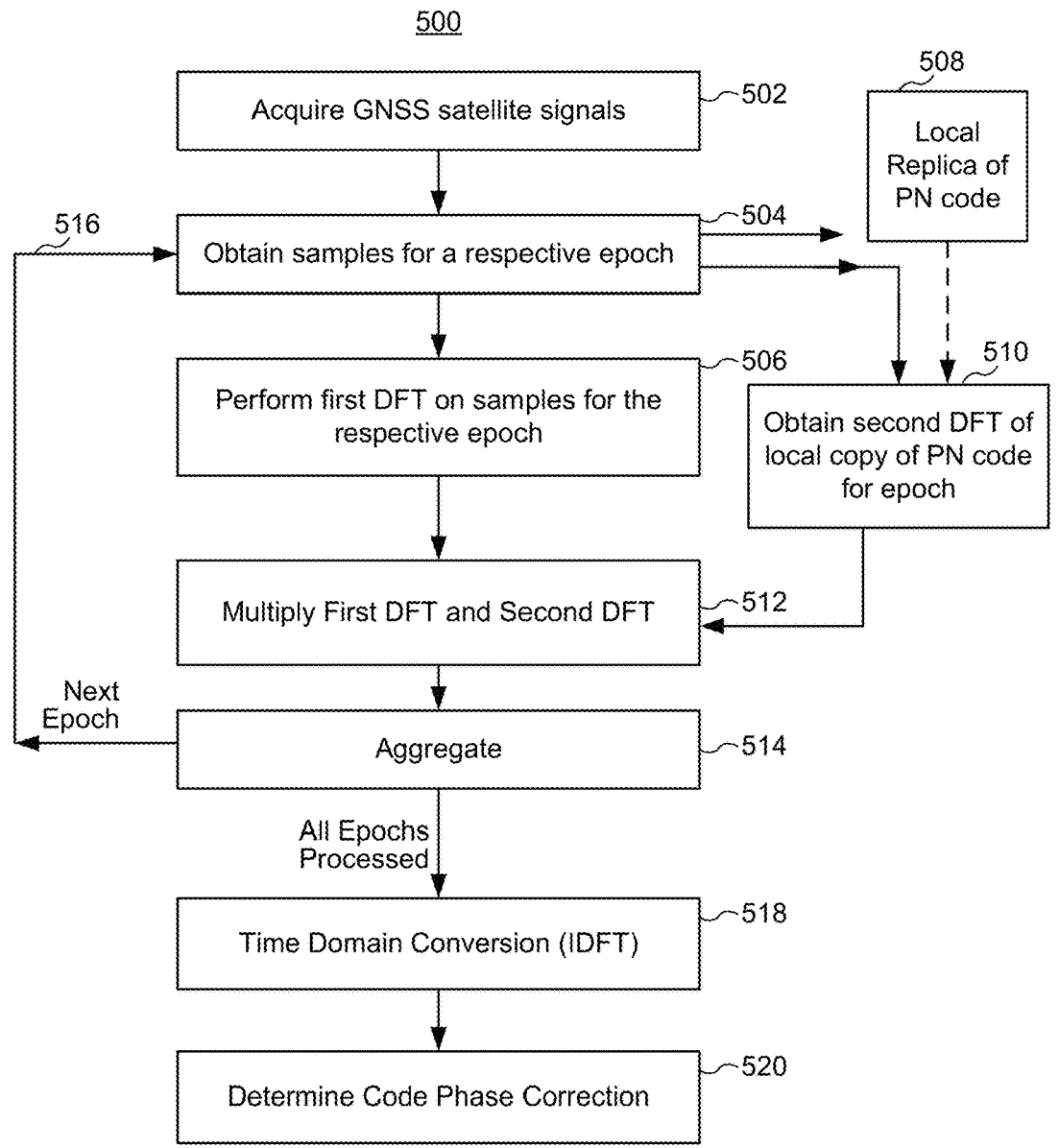
FIG. 5 is a flow chart of a method of tracking a signal from a satellite in a global navigation satellite system (GNSS) using discrete Fourier transforms (DFTs), in accordance with some embodiments.

FIG. 5 illustrates a method 500 for determining a code phase correction for tracking satellite signals. In some embodiments, the method 500 is performed at a mobile object. In some embodiments, the mobile object acquires GNSS satellite signals (502), including a respective channel signal for each channel of the satellite signals.

In some embodiments, for a respective satellite channel signal, the mobile object obtains samples of the respective satellite channel signal. In some embodiments, the respective satellite channel signal is encoded with a pseudorandom number (PN) sequence having a sequence of chips. In some embodiments, the method 500 tracks the respective satellite channel signal by performing mini-batch DFTs for a plurality of epochs of the satellite channel signal. For example, an epoch corresponds to (e.g., has a same duration as, and overlaps at least partially) a respective chip in the PN sequence. In some embodiments, performing the mini-batch DFTs for the plurality of epochs includes, for a respective epoch, computing a DFT (or FFT) of the samples for the respective epoch, and multiplying the result with a computed DFT (or FFT) of samples of a local replica of the PN sequence. In some embodiments, the DFT for the respective epoch is calculated using only the samples of the respective epoch (e.g., corresponding to one chip), while the DFTs of the local replica of the PN sequence is calculated (or precomputed) using samples that are offset from the samples of the received channel signal, e.g., buy up to one chip preceding and following the respective chip corresponding to the respective epoch. Accordingly, the mobile object uses the calculated DFTs to determine a local offset for the code phase of the channel signal.

For example, for a satellite channel signal that is modulated using BPSK or BOC, the local replica of PN code 508 loads samples that span 3 chips (e.g., or another number of chips determined based on the uncertainty of the code phase shift) into the second buffer 408. As such, three chips (or another number of chips) are loaded in the second buffer 408 (e.g., for the local replica), while only one chip is loaded in the first buffer (e.g., to minimize the FFT size).

In some embodiments, if the satellite channel signal is modulated using CSK, for example, the uncertainty is larger than 3 chips, and the samples are loaded into the second buffer to span 257 chips. For example, the CSK (Code Shifting Keying) modulation has been used by QZSS L6 to support fast data transmission. However, the initial chip phase for each code period is varying among one of 256 possibilities, such that the local code replica should extend far enough to make sure the local chip phase, with respect to the received signal, at minimum ranges from 1 chip in advance to 256 chips in delay. This requirement significantly increases the number of correlators, and this makes the mini-batch DFT with complexity of O(N log N) efficient to implement CSK demodulation.

In some embodiments, a second DFT is obtained 510 for the samples that span the 3 chips (e.g., or other number of chips determined based on the uncertainty for the respective modulation). In some embodiments, the second DFT is precalculated for the local copy of the PN sequence and stored in a table, such that the second DFT (or a conjunction of the second DFT) is obtained by performing a lookup in the table.

As such, in the example of BPSK using 3 chips as the range of uncertainty in the code phase of the received channel signal, the mobile object calculates a DFT correlation between samples for the respective chip (e.g., corresponding to a current epoch), and samples for an early, punctual, and late chip (e.g., 3 chips) of the local copy of the PN sequence by multiplying (512) the first DFT and a conjugate of the second DFT. For example, the DFTs of the local replica include samples that span at least + and −1 chip from the chip corresponding to the respective epoch. In an example where there are 40 samples per chip, the first DFT is performed on the 40 samples of the respective chip, and the second DFT is performed on 120 samples, corresponding to 3 chips: an early chip, a punctual chip, and a late chip.

The mobile object aggregates (514) the DFT correlation for the respective epoch with any previous epochs (e.g., of the current PN sequence period), and repeats steps 504-512 until all epochs (516) of the current PN sequence period have been processed (e.g., at the Mth DFT).

After completing the DFT correlations for the epochs in the PN sequence period, an inverse discrete Fourier transform (IDFT) is used to convert the aggregated results for the PN sequence period into the time domain (518). The mobile object determines, in real-time (e.g., before the next PN sequence period), the code phase correction 520 based on the peak index signal (of the resulting IDFT), as described above with reference to maximum selection module 418 (FIG. 4).

FIG. 6 illustrates storage of samples in the first buffer 404 and the second buffer 408. In some embodiments, the samples in the first buffer 404 and the second buffer 408 are stored by initially (e.g., at a first epoch 600 for the PN sequence period) setting the first buffer 404 with all zeroes, where the first buffer 404 includes a first section of the buffer 404a ($N_{LOAD}$ samples) and a second section of the buffer 404b ($N_{BUF}$−$N_{LOAD}$ samples); the second buffer 408 is also pre-loaded, where a first section of buffer 408a ($N_{LOAD}$ samples) is set with zeroes, and a second section of buffer 408b ($N_{BUF}$−$N_{LOAD}$ samples) is set with samples from the PN sequence (e.g., a portion of the local replica of the PN sequence corresponding to the samples for the epoch 600). The first sample in the second section of buffer 408b belongs to the ($L_{PN}$−1)th chip, and the last sample in the second section of buffer 408b belongs to the chip indexed by $K_{LAST}$, e.g., as defined by Equation 4. In some embodiments, the DFT correlator 414 is reset to be all zeroes so it is ready to accumulate the DFT result for the current PN sequence period.

In some embodiments, buffer 408 is initially loaded with samples for 3 chips (or another number of chips, depending on the uncertainty in the code phase of the channel signal being tracked) of the local replica of the PN sequence for the first epoch; and for each subsequent epoch, samples for one additional chip are added to the buffer (e.g., the other 2 chips are shifted over, resulting in the buffer 408 having a different set of 3 chips for each epoch, with the buffered 408 samples for each epoch overlapping the samples for the prior epoch by the samples for 2 chips).

In some embodiments, at a respective epoch, such as epoch 602 in FIG. 6, $N_{LOAD}$ received samples are stored into the first section of the first buffer 404c and the same number of samples from the local replica are shifted into the second section of the second buffer 408d. Then the data in the first buffer 404 are transferred to the first DFT buffer 405, and the data in the second buffer 408 are transferred to the second DFT buffer 409.

As illustrated in FIG. 6, the first DFT 406 performs the DFT computation for data in the first DFT buffer 405 and the second DFT 410 executes the DFT computation for the data in the second DFT buffer 409 (e.g., and passes a conjugate of the second DFT result, produced by conjugate operation 411, to multiply module 412). The element-wise multiply module 412, by taking the kth element of a vector signal 606 output from the first DFT 406 and the kth element of a vector signal 608 output from the conjugate operation 411, generates the kth element of the vector signal 610, which is input to aggregator 413. The previous vector signal 612 stored in the DFT correlator 414 (also referred to herein as a register) is added (e.g., aggregated via aggregator 413) with the vector signal 610 to create the vector signal 614 which is stored in the DFT correlator 414.

The process is repeated for each epoch in the PN sequence period (e.g., until the Mth DFT, as described above), before performing the IDFT for the aggregated correlations. The process shown in FIG. 5 using the mini-batch DFT tracking engine operates in a pipelined manner so as to process the received channel signal in real time and to produce final DFT correlation results, 614, for each PN sequence period at the same rate that the channel signal is received. For example, in embodiments in which one chip of new data is shifted into the first buffer 404 per epoch, the number of epochs over which the DFT correlation result, 614, for each respective PN sequence period is equal to the number of chips in the PN sequence. Thus, if there are N (e.g., 1023) chips in the PN sequence, a DFT correlation result for each PN sequence period requires N iterations of the mini-DFT computation and accumulation operations. Furthermore, the IDFT and peak selection operations for the current (e.g., just completed) PN sequence period, discussed with respect to FIG. 4 and FIGS. 7A-7E, are performed while the mini-batch DFT tracking engine begins while the process of processing received channel signal samples a next PN sequence period.

FIGS. 7A-7E illustrate a flow chart of a method 700 of tracking a signal from a satellite in a global navigation satellite system (GNSS), and more particularly, of using mini-batch DFTs to track the signal, in accordance with some embodiments. Method 700 is typically performed by a moveable object having circuitry, such as a signal receiver (e.g., receiver 120, FIG. 1) and one or more processors (e.g., one or more processors of computer system 130, FIG. 1), but optionally is performed, at least in part, by a system external to or remote from the moveable object. In some embodiments, method 700 is performed by a GNSS signal tracking engine (e.g., mini-batch DFT tracking engine 314, FIG. 3) of a signal receiver on a mobile object. For ease of explanation, method 700 will be explained as being performed by a mobile object, but it will be understood that at least some portions of method 700 could be performed by an external system.

The mobile object receives (702) satellite navigation signals from a plurality of satellites including a respective channel signal for each respective channel of the satellite navigation signals received from a respective satellite of the plurality of satellites. Each respective channel signal is encoded with a pseudorandom number (PN) sequence having a sequence of chips. For example, each respective channel signal comprises a carrier signal modulated with a pseudorandom number (PN) sequence having a sequence of chips (e.g., having at least 511 chips (e.g., see "Code length," Table 3).

For a respective channel signal (704): the mobile object performs operations 708, 710, 728, and 732. For example, for the respective channel signal, the mobile object generates (708) and aggregates intermediate results for a plurality of epochs of a single pseudorandom number (PN) sequence period of the PN sequence, including: (i) for each respective epoch of the plurality of epochs, analyzing (710) samples of the respective channel signal, limited to samples for the respective epoch of the PN sequence period, using a discrete Fourier transform (DFT) (e.g., an FFT that is implemented in hardware circuitry), to produce an intermediate result for the respective epoch, and (ii) aggregating (728) the intermediate results for the plurality of epochs to produce a DFT (frequency domain) correlation result (e.g., for an entire, single PN sequence period).

In some embodiments, the mobile object acquires (706) the satellite navigation signal corresponding to the respective channel, wherein acquiring the satellite navigation signal corresponding to the respective channel includes determining a frequency and an initial code phase for the respective channel of the respective satellite. In some embodiments, after acquiring the satellite navigation signal corresponding to the respective channel, the mobile object tracks the satellite navigation signal corresponding to the respective channel so as to maintain a local replica of the satellite navigation signal corresponding to the respective channel that is within one-tenth of a chip of the satellite navigation signal corresponding to the respective channel, wherein tracking the satellite navigation signal corresponding to the respective channel includes: said generating and aggregating intermediate results for a plurality of epochs of a single PN sequence period (e.g., at step 708), and processing of the DFT correlation result to produce a code phase correction for the respective channel of the respective satellite (e.g., at step 732).

In some embodiments, analyzing samples of the respective channel signal to produce an intermediate result for the respective epoch comprises (712): performing a first DFT on samples of the respective channel signal, limited to samples for the respective epoch of the PN sequence period, to produce a first result; obtaining a second result corresponding to a second DFT performed on a portion of a local copy of a pseudorandom number (PN) code corresponding to the respective channel and the epoch; and multiplying the first result and the second result to produce the intermediate result for the respective epoch. In some embodiments, obtaining the second result includes performing a lookup of a table storing values of the second DFT. In some embodiments, obtaining the second result comprises performing the second DFT on a portion of a local copy of a pseudorandom number (PN) code corresponding to the respective channel and the epoch, limited to samples for the respective epoch of the PN sequence period (e.g., samples corresponding to early, punctual and late chips of the PN sequence, where the punctual chip corresponds to (e.g., overlaps in time with) the samples of the respective channel signal for the epoch).

In some embodiments, method 700 includes storing a local copy of the PN code (e.g., also referred to herein as a PRN local sequence or a replica of the PN sequence) for respective satellites, or storing parameters needed to generate the PRN codes for the respective satellite. For example, a PRN local sequence memory stores PRN codes (or values needed to generate the PRN codes) for every satellite in every constellation for which acquisition engine 316 may attempt to acquire a satellite signal. In some embodiments, the stored (or generated) PRN codes are versions of the PRN codes corresponding to the decimated frequency (e.g., a GPS-CA signal, with a PRN length of 1023 chips and a chipping rate of 1.023 MHz will be 4092 values long with a decimated sampling rate of 4.092 MHz).

In some embodiments, the respective channel of the satellite navigation signals received from a respective satellite of the plurality of satellites is modulated (714) with the PN sequence using binary phase shift keying (BPSK). In some embodiments, the first DFT performed on samples of the respective channel signal, limited to samples for the respective epoch of the PN sequence period, is limited to samples corresponding to one respective chip in the PN sequence encoded in the respective channel signal; and the second DFT performed on a portion of the local copy of the PN code corresponding to the respective channel and the respective epoch is limited to samples for the respective epoch of the PN sequence period for only N chips in the local copy of the PN code, including one respective chip corresponding to the respective epoch and one or more chips offset from the one respective chip in the local copy of the PN code, wherein N is an integer no greater than 7. For example, the second DFT is performed on 3 chips (or up to 7 chips), including the chip corresponding to the respective epoch, one or more prior chips corresponding to the PN sequence and one or more next chips in the PN sequence. For example, for the example of 3 chips, the 3 chips are sometimes referred to as the prompt/punctual, early and late chips.

In some embodiments, the respective channel of the satellite navigation signals received from a respective satellite of the plurality of satellites is modulated (716) with the PN sequence using code shift keying (CSK). In some embodiments, the first DFT performed on samples of the respective channel signal, limited to samples for the respective epoch of the PN sequence period, is limited to samples corresponding to one respective chip in the PN sequence encoded in the respective channel signal; and the second DFT performed on a portion of the local copy of the PN code corresponding to the respective channel and the respective epoch is limited to samples for the respective epoch of the PN sequence period for only N chips in the local copy of the PN code, including one respective chip corresponding to the respective epoch and one or more chips offset from the one respective chip in the local copy of the PN code, wherein N is an integer no greater than 261. For example, as described above with reference to FIG. 5, in some embodiments, using CSK requires performing the second DFT on samples spanning at least 257 chips (e.g., because the initial chip phase is unknown in the CSK example).

In some embodiments, performing the first DFT on samples of the respective channel signal, limited to samples for the respective epoch of the PN sequence period, to produce the first result includes (718) loading a first buffer with the samples for the respective epoch of the PN sequence period, and padding a remainder of the first buffer with zeroes. For example, if 256 samples are loaded into the first buffer, and the first buffer's size is 512, then the remainder of the first buffer is filled with 0s (e.g., 256 zero-values). In another example, if 40 samples for the respective epoch of the received channel signal are loaded into the first buffer, and the first buffer's size is 256, then the first buffer is padded with 216 zero-values. In some embodiments, the second buffer for the local copy of the PN sequence is loaded with samples to fill the buffer. In some embodiments, the second buffer is loaded with 3 (or up to 7) chips from the local copy of the PN sequence to fill the buffer (e.g., the second buffer is not padded with zeroes), as described with reference to FIGS. 5 and 6.

In some embodiments, the first buffer has (720) a size (e.g., length) that is less than or equal to a size of the first DFT. For example, the first buffer contains data for the samples for the respective epoch of the PN sequence period followed by zero data. In some embodiments, the second buffer is filled with non-zero data corresponding to the local copy of the PN sequence.

In some embodiments, the DFT used to analyze samples of the respective channel signal is (721) implemented in DFT hardware circuitry for performing DFT computations. For example, the DFT hardware circuitry is distinct from a processor that performs the computing and navigation operations. In some embodiments, the hardware circuitry is implemented in an application specific integrated circuit distinct from the processor that performs the computing and navigation operations. In some embodiment, the hardware circuitry is described with reference to mini-batch DFT tracking module 314 in FIGS. 3 and 4.

In some embodiments, the plurality of epochs is (722) a first a number of epochs, the samples for the respective epoch of the PN sequence period on which the first DFT is performed is a first number samples per epoch, and the first number of epochs corresponds to a total number of samples for the PN sequence period divided by the first number of samples per epoch. For example, for a respective epoch, the first number of samples is the number of samples for a single chip corresponding to the epoch. Also, for example, the number of epochs is the number of chips in the PN sequence.

In some embodiments, the first number of samples is determined (724) based on a sampling rate at which the respective channel signal is sampled, and the first number of samples corresponds to a number of samples per chip of the PN sequence (e.g., used to modulate the respective channel signal). For example, the size of the second DFT (and the number of samples) depends on the range of the PN sequence uncertainty (e.g., in chips). For example, for BPSK and BOC modulated signals, an uncertainty of 3 chips (e.g., early, punctual, and late) is optionally selected. In some embodiments, the sample rate of the first number of samples is the same for two or more of L1-CA, L2CM, G1C, and/or another GNSS signal.

In some embodiments, the plurality of epochs for the PN sequence period includes (726) an epoch for, or corresponding to, each chip of the PN sequence encoded in the respective channel signal. For example, each epoch corresponds to a chip (e.g., a single chip) in the PN sequence of chips.

In some embodiments, prior to processing the DFT correlation result to produce a code phase correction for the respective channel of the respective satellite, the mobile object acquires (730) a satellite navigation signal corresponding to the respective channel, wherein acquiring the satellite navigation signal corresponding to the respective channel includes determining an initial code phase for the respective channel of the respective satellite. For example, the satellite receiver uses a distinct process from method 700, and in some embodiments a distinct hardware module from the mini-batch DFT tracking engine 314, to acquire the satellite navigation signal corresponding to the respective channel. The initial code phase for the respective channel of the respective satellite is used to determine which chip of the PN sequence is initially used by the satellite receiver as the punctual chip to be correlated with a chip of the received channel signal while tracking the received channel signal. While tracking the received channel signal, the initial code phase is updated in accordance with the code phase corrections produced by performing method 700.

For the respective channel signal, the mobile object processes (732) the DFT correlation result to produce a code phase correction for the respective channel of the respective satellite.

In some embodiments, processing the DFT correlation result comprises (734): performing an inverse discrete Fourier transform (IDFT) on the DFT correlation result to produce a time domain correlation; and determining, based on the time domain correlation, a code phase correction for a tracking loop corresponding to the respective channel of the satellite navigation signals received from the respective satellite of the plurality of satellites. For example, the satellite receiver, or the GNSS signal tracking engine of the satellite received, identifies a peak in the time domain correlation, and identifies a code phase correction based on the identified peak in the time domain correlation.

In some embodiments, the mobile object produces (736), in real time, a respective code phase correction for each successive PN sequence period of the respective channel signal, thereby producing respective code phase corrections for successive PN sequence periods of the respective channel signal. For example, as described above with reference to FIG. 4, DFT correlator 414 is updated with the aggregation calculated by aggregator 413 for each epoch. In some embodiments, the second buffer 408 is initially loaded with samples that span 3 chips (e.g., for the first epoch), and the data in the buffer is subsequently shifted by 1 chip (e.g., or by a minimum amount such that the shift in data satisfies the resolution and minimizes the processing of the DFTs) to obtain the DFT for the next respective epoch. As such, the size of the DFT (e.g., and the size of the buffer) is minimized. It will be understood that the DFTs are computed, in real time, such that the code phase correction is generated (e.g., updated) for one PN sequence period before, or during a first epoch of, the next PN sequence period.

In accordance with the code phase correction, the mobile object computes (738) position and velocity estimates for the mobile object. In some embodiments, the code phase corrections for a plurality (e.g., 2 to 10) of epochs are combined and the resulting combined code phase correction is used to adjust the code phase of the local replica of the PN sequence for the respective channel signal, and to compute position and velocity estimates for the mobile object.

The mobile object performs (740) a navigation function (e.g., routing of the mobile object; displaying on a map one or more suggested routes for moving the mobile object from a current location to a specified or target location; and/or providing information regarding locations nearby the mobile object or along a propose route of the mobile object) for the mobile object in accordance with the computed position and velocity estimates for the mobile object.

It will be understood that although the terms "first," "second," etc. may be used herein to describe various elements, these elements should not be limited by these terms. These terms are only used to distinguish one element from another. For example, a first contact could be termed a second contact, and, similarly, a second contact could be termed a first contact, without changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for tracking a mobile object according to signals from satellites, the method comprising:

at the mobile object, receiving satellite navigation signals from a plurality of satellites including a respective channel signal for each respective channel of the satellite navigation signals received from a respective satellite of the plurality of satellites, each respective channel signal encoded with a pseudorandom number (PN) sequence having a sequence of chips, wherein the PN sequence is the minimum repeating sequence of chips in the signal;

for the respective channel signal:

acquiring the respective channel signal, wherein acquiring the respective channel signal includes determining an initial code phase for the respective channel of the respective satellite;

after acquiring the respective channel signal, tracking the code phase for the respective channel by:

generating and aggregating intermediate results for a plurality of epochs of a single pseudorandom number (PN) sequence period of the PN sequence, including:

for each respective epoch of the plurality of epochs, analyzing samples of the respective channel signal, limited to samples for the respective epoch of the PN sequence period, using a discrete Fourier transform (DFT), to produce an intermediate result for the respective epoch; and aggregating the intermediate results for the plurality of epochs to produce a DFT correlation result; and processing the DFT correlation result to produce a code phase correction for the respective channel of the respective satellite;

in accordance with the code phase correction, computing position and velocity estimates for the mobile object; and performing a navigation function for the mobile object in accordance with the computed position and velocity estimates for the mobile object.

2. The method of claim 1, wherein analyzing samples of the respective channel signal to produce an intermediate result for the respective epoch comprises:

performing a first DFT on samples of the respective channel signal, limited to samples for the respective epoch of the PN sequence period, to produce a first result;

obtaining a second result corresponding to a second DFT performed on a portion of a local copy of a pseudorandom number (PN) code corresponding to the respective channel and the respective epoch; and multiplying the first result and the second result to produce the intermediate result for the respective epoch.

3. The method of claim 2, wherein:

the respective channel of the satellite navigation signals received from a respective satellite of the plurality of satellites is modulated with the PN sequence using binary phase shift keying;

the first DFT performed on samples of the respective channel signal, limited to samples for the respective epoch of the PN sequence period, is limited to samples corresponding to one respective chip in the PN sequence encoded in the respective channel signal; and the second DFT performed on a portion of the local copy of the PN code corresponding to the respective channel and the epoch is limited to samples for the respective epoch of the PN sequence period for only N chips in the local copy of the PN code, including one respective chip corresponding to the respective epoch and one or more chips offset from the one respective chip in the local copy of the PN code, wherein N is an integer no greater than 7.

4. The method of claim 2, wherein:

wherein the respective channel of the satellite navigation signals received from a respective satellite of the plurality of satellites is modulated with the PN sequence using code shift keying;

the first DFT performed on samples of the respective channel signal, limited to samples for the respective epoch of the PN sequence period, is limited to samples corresponding to one respective chip in the PN sequence encoded in the respective channel signal; and the second DFT performed on a portion of the local copy of the PN code corresponding to the respective channel and the epoch is limited to samples for the respective epoch of the PN sequence period for only N chips in the local copy of the PN code, including one respective chip corresponding to the respective epoch and one or more chips offset from the one respective chip in the local copy of the PN code, wherein N is an integer no greater than 261.

5. The method of claim 2, wherein performing the first DFT on samples of the respective channel signal, limited to samples for the respective epoch of the PN sequence period, to produce the first result includes loading a first buffer with the samples for the respective epoch of the PN sequence period, and padding a remainder of the first buffer with zeroes.

6. The method of claim 5, wherein the first buffer has a size that is less than or equal to a size of the first DFT.

7. The method of claim 2, wherein:

the plurality of epochs is a first a number of epochs, the samples for the respective epoch of the PN sequence period on which the first DFT is performed is a first number samples per epoch, and the first number of epochs corresponds to a total number of samples for the PN sequence period divided by the first number of samples per epoch.

8. The method of claim 7, wherein the first number of samples is determined based on a sampling rate at which the respective channel signal is sampled, and the first number of samples corresponds to a number of samples per chip of the PN sequence.

9. The method of claim 2, wherein:

the first DFT performed on samples of the respective channel signal, limited to samples for the respective epoch of the PN sequence period, is limited to samples corresponding to one respective chip in the PN sequence encoded in the respective channel signal; and the second DFT performed on a portion of the local copy of the PN code corresponding to the respective channel and the epoch is limited to samples for the respective epoch of the PN sequence period less than the length of the local copy of the PN code.

10. The method of claim 1, wherein processing the DFT correlation result comprises:

performing an inverse discrete Fourier transform (IDFT) on the DFT correlation result to produce a time domain correlation; and determining, based on the time domain correlation, the code phase correction for the respective channel of the satellite navigation signals received from the respective satellite of the plurality of satellites.

11. The method of claim 1, wherein the plurality of epochs for the PN sequence period includes an epoch for, or corresponding to, each chip of the PN sequence encoded in the respective channel signal.

12. The method of claim 1, wherein the DFT used to analyze samples of the respective channel signal is implemented in DFT hardware circuitry for performing DFT computations.

13. The method of claim 1, including, for a respective channel, acquiring a satellite navigation signal corresponding to the respective channel, wherein acquiring the satellite navigation signal corresponding to the respective channel includes determining a frequency and an initial code phase for the respective channel of the respective satellite;

after acquiring the satellite navigation signal corresponding to the respective channel, tracking the satellite navigation signal corresponding to the respective channel so as to maintain a local replica of the satellite navigation signal corresponding to the respective channel that is within one-tenth of a chip of the satellite navigation signal corresponding to the respective channel;

wherein tracking the satellite navigation signal corresponding to the respective channel includes:

said generating and aggregating intermediate results for the plurality of epochs of the single PN sequence period, and said processing of the DFT correlation result to produce the code phase correction for the respective channel of the respective satellite.

14. The method of claim 1, including producing, in real time, respective code phase corrections for successive PN sequence periods of the respective channel signal.

15. A navigation module for a mobile object, comprising:

one or more processors;

a satellite receiver to receive satellite navigation signals from a plurality of satellites, wherein the satellite receiver is configured to:

receive satellite navigation signals from a plurality of satellites including a respective channel signal for each respective channel of the satellite navigation signals received from a respective satellite of the plurality of satellites, each respective channel signal encoded with a pseudorandom number (PN) sequence having a sequence of chips, wherein the PN sequence is the minimum repeating sequence of chips in the signal;

for the respective channel signal:

acquire the respective channel signal, wherein acquiring the respective channel signal includes determining an initial code phase for the respective channel of the respective satellite;

after acquiring the respective channel signal, track the code phase for the respective channel by:

generating and aggregating intermediate results for a plurality of epochs of a single pseudorandom number (PN) sequence period of the PN sequence, including:

for each respective epoch of the plurality of epochs, analyzing samples of the respective channel signal, limited to samples for the respective epoch of the PN sequence period, using a discrete Fourier transform (DFT), to produce an intermediate result for the respective epoch; and aggregating the intermediate results for the plurality of epochs to produce a DFT correlation result; and processing the DFT correlation result to produce a code phase correction for the respective channel of the respective satellite; and memory storing one or more programs that, when executed by the one or more processors, cause the navigation module for the mobile object to:

in accordance with the code phase correction, compute position and velocity estimates for the mobile object; and perform a navigation function for the mobile object in accordance with the computed position and velocity estimates for the mobile object.

16. The navigation module of claim 15, wherein analyzing samples of the respective channel signal to produce an intermediate result for the respective epoch comprises:

performing a first DFT on samples of the respective channel signal, limited to samples for the respective epoch of the PN sequence period, to produce a first result;

obtaining a second result corresponding to a second DFT performed on a portion of a local copy of a pseudo-random number (PN) code corresponding to the respective channel and the respective epoch; and multiplying the first result and the second result to produce the intermediate result for the respective epoch.

17. The navigation module of claim 16, wherein:

the respective channel of the satellite navigation signals received from a respective satellite of the plurality of satellites is modulated with the PN sequence using binary phase shift keying;

the first DFT performed on samples of the respective channel signal, limited to samples for the respective epoch of the PN sequence period, is limited to samples corresponding to one respective chip in the PN sequence encoded in the respective channel signal; and the second DFT performed on a portion of the local copy of the PN code corresponding to the respective channel and the epoch is limited to samples for the respective epoch of the PN sequence period for only N chips in the local copy of the PN code, including one respective chip corresponding to the respective epoch and one or more chips offset from the one respective chip in the local copy of the PN code, wherein N is an integer no greater than 7.

18. The navigation module of claim 16, wherein:

wherein the respective channel of the satellite navigation signals received from a respective satellite of the plurality of satellites is modulated with the PN sequence using code shift keying;

the first DFT performed on samples of the respective channel signal, limited to samples for the respective epoch of the PN sequence period, is limited to samples corresponding to one respective chip in the PN sequence encoded in the respective channel signal; and the second DFT performed on a portion of the local copy of the PN code corresponding to the respective channel and the epoch is limited to samples for the respective epoch of the PN sequence period for only N chips in the local copy of the PN code, including one respective chip corresponding to the respective epoch and one or more chips offset from the one respective chip in the local copy of the PN code, wherein N is an integer no greater than 261.

19. The navigation module of claim 16, wherein performing the first DFT on samples of the respective channel signal, limited to samples for the respective epoch of the PN sequence period, to produce the first result includes loading a first buffer with the samples for the respective epoch of the PN sequence period, and padding a remainder of the first buffer with zeroes.

20. The navigation module of claim 19, wherein the first buffer has a size that is less than or equal to a size of the first DFT.

* * * * *